US010126132B2

(12) United States Patent
Belt et al.

(10) Patent No.: US 10,126,132 B2
(45) Date of Patent: Nov. 13, 2018

(54) DEVICES, SYSTEMS, AND METHODS FOR NAVIGATION AND USAGE GUIDANCE IN A NAVIGABLE SPACE USING WIRELESS COMMUNICATION

(71) Applicant: Blind InSites, LLC, Plano, TX (US)

(72) Inventors: Darwin Wayne Belt, Plano, TX (US); Armand Edwin Fisher, Euless, TX (US); Jeffrey D. Hilton, Carrollton, TX (US); April Ryan Hilton, Carrollton, TX (US); Jessica B. Hipp, Temple, NH (US); Stephanie Lynge, Royse City, TX (US)

( * ) Notice: Subject to any disclaimer, the term of this patent is extended or adjusted under 35 U.S.C. 154(b) by 0 days.

(21) Appl. No.: 15/871,976

(22) Filed: Jan. 15, 2018

(65) Prior Publication Data
US 2018/0202813 A1 Jul. 19, 2018

Related U.S. Application Data

(60) Provisional application No. 62/446,931, filed on Jan. 17, 2017.

(51) Int. Cl.
*G01C 21/20* (2006.01)
*H04W 4/02* (2018.01)
*H04M 1/725* (2006.01)

(52) U.S. Cl.
CPC .......... *G01C 21/206* (2013.01); *H04W 4/023* (2013.01); *H04M 1/72572* (2013.01)

(58) Field of Classification Search
CPC . G01C 21/206; H04W 4/023; H04W 1/72572
See application file for complete search history.

(56) References Cited

U.S. PATENT DOCUMENTS 4,505,061 A 3/1985 Neuburger et al.
55,555,660 9/1996 Whitehouse et al.
(Continued)

FOREIGN PATENT DOCUMENTS

WO WO2013045557 4/2013
WO WO2014137016 9/2014

OTHER PUBLICATIONS

Indoor Navigation System Kassim et al. retrieved on May 8, 2017 from https://thesai.org/Downloads/Volume7No2/Paper_76-Indoor_Navigation_System_based_on_Passive_RFID.pdf.
(Continued)

*Primary Examiner* — Nicholas Kiswanto
(74) *Attorney, Agent, or Firm* — Caldwell Intellectual Property Law

(57) ABSTRACT

A device for navigation and usage guidance in a navigable space includes a wireless interrogator including an antenna and a driver circuit that transmits an interrogation signal providing power to a passive transponder at a first location in a navigable space and receives from the transponder a return signal. The device includes a portable computing device coupled to the interrogator and configured to parse the return signal for at least a textual element, extract therefrom a unique identifier of the transmitter, identify, in a first data structure the first location and a second location of a user feature, determine a location of the user, retrieve from a second data structure usage data, and generate a usage sequence for using the user feature. The device includes a user output component coupled to the portable computing device and configured to receive and provide to the user the usage sequence.

23 Claims, 11 Drawing Sheets

(56) References Cited

U.S. PATENT DOCUMENTS

| | | | |
|---|---|---|---|
| 5,733,127 A | | 3/1998 | Mecum |
| 6,992,592 B2 | | 1/2006 | Gilfix et al. |
| 8,082,872 B2 | | 12/2011 | Cook et al. |
| 8,094,012 B1 | * | 1/2012 | Tran .................. G01S 11/16 340/539.13 |
| 8,294,554 B2 | * | 10/2012 | Shoarinejad ............ G01S 7/003 340/10.1 |
| 8,362,883 B2 | | 1/2013 | Hale et al. |
| 8,825,398 B2 | * | 9/2014 | Alexandre ............. A61H 3/061 701/505 |
| 9,311,586 B2 | * | 4/2016 | Robinette .......... G08B 13/1427 |
| 9,733,334 B2 | * | 8/2017 | Serrano Olmedo .. G01S 5/0009 |
| 2002/0121986 A1 | | 9/2002 | Krukowski et al. |
| 2008/0256445 A1 | | 10/2008 | Olch et al. |
| 2009/0032590 A1 | * | 2/2009 | Hopkins ................ A61H 3/061 235/385 |
| 2011/0281804 A1 | | 12/2011 | Chan |
| 2014/0292508 A1 | | 10/2014 | Bhogal et al. |
| 2015/0198454 A1 | | 7/2015 | Moore et al. |
| 2015/0330787 A1 | * | 11/2015 | Cioffi ................ G06Q 30/0261 701/537 |
| 2016/0123745 A1 | | 5/2016 | Cotier et al. |
| 2016/0170508 A1 | | 6/2016 | Moore et al. |
| 2016/0259027 A1 | * | 9/2016 | Said ........................ H04W 4/33 |
| 2017/0215032 A1 | * | 7/2017 | Horbal .................... H04W 4/02 |
| 2018/0078444 A1 | * | 3/2018 | Gamerman ............. G01S 17/89 |

OTHER PUBLICATIONS

Indoor Wayfinding RFID Apr. 2015 Retrieved May 8, 2017 from http://www.ijcsonline.com/IJCS/IJCS_2015_0204005.pdf.

* cited by examiner

DEVICES, SYSTEMS, AND METHODS FOR NAVIGATION AND USAGE GUIDANCE IN A NAVIGABLE SPACE USING WIRELESS COMMUNICATION

RELATED APPLICATION DATA

This application claims the benefit of priority of U.S. Provisional Patent Application Ser. No. 62/446,931, filed on Jan. 17, 2017, and titled "A SYSTEM AND METHOD FOR WAYFINDING AND INFORMATION GATHERING USING WIRELESS TECHNOLOGY," which is incorporated by reference herein in its entirety.

FIELD OF THE INVENTION

The present invention generally relates to the field of localized wireless communication. In particular, the present invention is directed to devices, systems, and methods for navigation and usage guidance in a navigable space using wireless communication.

BACKGROUND

Navigation presents a perennial challenge for visually impaired persons. Without the ability to rely on sight, obstacles and goals alike are more difficult to find. The art of wayfinding, or navigating, orienting oneself in, and using physical space, requires constant learning and innovation, and has given rise to a number of techniques used in concert. On sidewalks and in other areas designed for frequent travel, such as hallways, it is often possible to feel the way by touching railings and walls, and using aids such as white canes to search the ground for guides and hazards. In familiar environs, such as the home or office, memory can serve as a primary guide, as the visually impaired person follows a mental map he or she has formed through familiarity, with aids such as the white cane serving in a supplemental role to discover unexpected obstacles. Some combination of feeling the way and memory can be used to explore most areas in time, but the existing methods often fall short in unfamiliar spaces that require more complex interaction, such as public bathrooms. It can be awkward and slow to find a sink or a bathroom stall by feel, and the layout of such spaces are not sufficiently predictable for navigation by guesswork.

SUMMARY OF THE DISCLOSURE

In an aspect, a device for navigation and usage guidance in a navigable space, the device on the person of a user, includes a wireless interrogator. The wireless interrogator includes an antenna and a driver circuit. The driver circuit is configured to wirelessly transmit, via the antenna, an interrogation signal providing electrical power to a passive transponder at a first location in a navigable space, and wirelessly receive from the transponder, and via the antenna, a return signal. The device includes a portable computing device, the portable computing device coupled to the wireless interrogator. The portable computing device is designed and configured to parse the return signal for at least a textual element, extract from the at least a textual element, a unique identifier of the transmitter, identify, in a first data structure linking the unique identifier to a map of the navigable space, the first location and a second location of a user feature, determine, as a function of the first location, a location of the user, retrieve, from a second data structure linking the feature to usage data for using the feature, the usage data, and generate a usage sequence for using the user feature, as a function of the location of the user, the second location, and the usage data. The device includes a user output component coupled to the portable computing device. The user output component is configured to receive, from the portable computing device, the at least a usage instruction and provide to the user the at least a usage instruction.

In another aspect, a method of navigation and usage guidance in a navigable space includes receiving, by a portable computing device coupled to a wireless receiver, a first signal from a transmitter at a first location in a navigable space. The method includes parsing, by the portable computing device, the first signal for at least a textual element. The method includes extracting, by the portable computing device, from the at least a textual element, a unique identifier of the transmitter. The method includes identifying, by the portable computing device, in a first data structure linking the unique identifier to the first location, the first location. The method includes determining, by the portable computing device, as a function of the first location, a location of the user. The method includes providing, by the computing device, via a user output component, the user location.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to devices, systems, and methods that utilize localized wireless communication to provide a visually impaired person with information he or she can use to utilize a user feature, such as an ATM or bathroom stall, or to navigate an unfamiliar space, efficiently, and with dignity. Information indicating location of items of interest or obstacles within the environment is conveyed to the user in an accessible way, giving the user an effective map of an otherwise unfamiliar space. Instructions concerning the use of features aid the user to avoid trial and error when engaging with the features, and information indicating whether features are currently in use permits the user to select unoccupied features without resorting to inquiries. Sighted users may also use some embodiments to aid in wayfinding as well, for instance for finding items or information about items in a retail store, or for understanding or translating information on a sign written in a foreign language.

Figure 1:
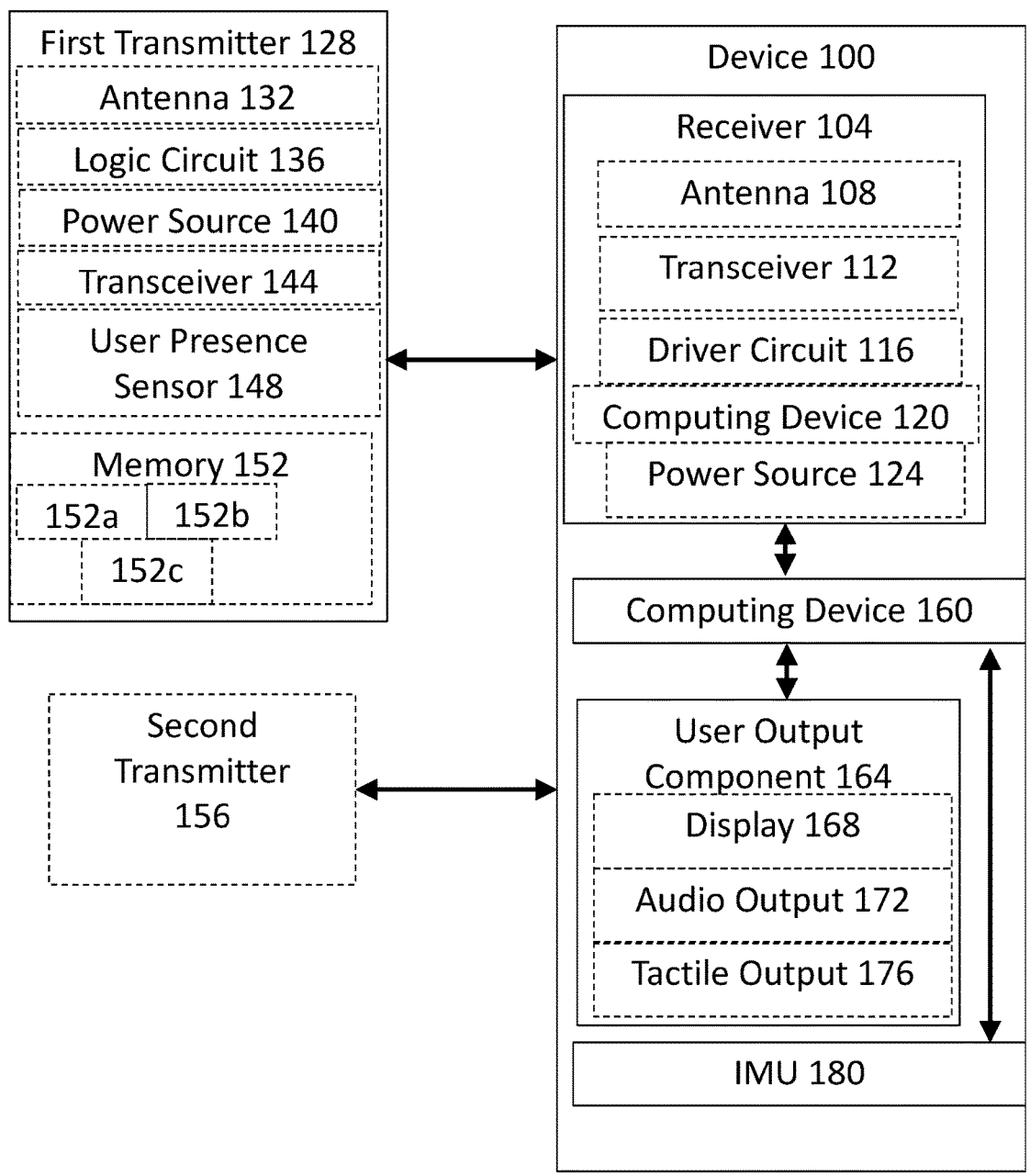
FIG. 1 is a block diagram illustrating an exemplary system in an embodiment.

Referring now to FIG. 1, a block diagram of an exemplary embodiment of a device 100 for navigation and usage guidance in a navigable space using wireless communication is illustrated. Device 100 is on the person of the user. In some embodiments, device 100 is on the person of the user if the user is carrying the receiver with the user. For example, and without limitation, device 100 may be on the person of the user if device 100 is in a pocket of the user's clothing, in a pocket or compartment of a portable container such as a backpack, satchel, briefcase, pocketbook, or the like, in a holster, in a harness, in a money belt, in a belt clip, or incorporated in a wayfinding aid, for instance as set forth in further detail below.

Continuing to refer to FIG. 1, device 100 includes a wireless receiver 104. Wireless receiver 104 may have an antenna 108. Wireless receiver 104 may include a wireless interrogator; in other words, the antenna 108 may be capable of inducing a current in an antenna of a passive transmitter through magnetic coupling, capacitive coupling, or other means. Wireless receiver 104 may be able to receive the signal transmitted by at least one first transmitter 128 using the antenna 108. In some embodiments, the wireless receiver 104 can transmit as well as receive signals. Wireless receiver 104 may include a transceiver 112, which both sends and receives signals; the transceiver 112 may be a system on a chip, including processing, memory, or any other functions together in a single integrated circuit. Transceiver 112 may exchange signals according to existing protocols, such as the BLUETOOTH protocol promulgated by Bluetooth SIG, Inc. of Kirkland, Wash. Transceiver 112 may further implement a "beacon" protocol; as a non-limiting example, the beacon protocol may be implemented using the IBEACON protocol produced by Apple, Inc. of Cupertino, Calif., the EDDYSTONE protocol produced by Google, Inc. of Mountain View, Calif., or a similar protocol. Antenna 108 may include a plurality of antennas; for example, and without limitation, antenna 108 may include a first antenna that transmits interrogation signal, and a second antenna that receives return signal. Antenna 108 may include multiple antennas that receive and/or transmit signals; for instance, antenna 108 may include antennas facing in various directions for transmitting interrogation signals and receiving return signals to and from various directions simultaneously. Similarly, wireless receiver 104 may include both an antenna 108 for receiving from and/or transmitting signals to a transmitter and a transceiver 112 that may be used for communicating with a mobile computing device, for instance as described below.

Still referring to FIG. 1, wireless receiver 104 includes a driver circuit driver circuit 112. Driver circuit 112 is an electric circuit, electrically coupled to antenna 108, that processes electric signals induced in antenna 112 by wireless signals, and processes the electric signals. In other words, driver circuit 112 may be any electrical circuit configured to wirelessly receive a signal from a transmitter, as described in further detail below, via antenna 108. Where wireless receiver 104 includes a wireless interrogator, driver circuit 112 may further be configured to wirelessly transmit an interrogation signal via the antenna to a passive transponder; the interrogation signal may provide electrical power to the passive transponder. Driver circuit 112 may further be configured to wirelessly receive a return signal from the transponder via the antenna.

With continued reference to FIG. 1, driver circuit 112 may include analog components, digital components, or both. For instance, driver circuit 112 may include one or more filters (not shown), such as a Butterworth filter, a Chebyshev filter, a band filter, or the like, to filter out noise or selectively receive particular frequencies or ranges of frequencies. Driver circuit 112 may include one or more amplifiers. Driver circuit 112 may include a logic circuit, or a circuit including at least one digital circuit element. Logic circuit may be hardwired; for instance, logic circuit may include logic hardware circuit components such as logic gates, multiplexors, demultiplexors, programmable circuits such as field-programmable arrays, read-only memory, and the like. Logic circuit may include memory, which may be any memory as described below in reference to FIG. 8. Logic circuit may include a computing device as described below in reference to FIG. 8. In some embodiments, the wireless receiver 104 includes a computing device 120; the computing device 120 may be any computing device as described below in reference to FIG. 8. As a non-limiting example, the wireless receiver 104 may be a mobile computing device such as a mobile phone, "smartphone," or tablet; wireless receiver 104 may be incorporated in a mobile computing device. Wireless receiver 104 may be incorporated in a special-purpose device, such as handheld device or device mounted on a finding aid that, as a non-limiting example, is wirelessly or otherwise coupled to a mobile or portable computing device. Computing device 120 may be a microcontroller.

Still referring to FIG. 1, wireless receiver 104 may include a power source 124. Power source 124 may include a power storage device; the power storage device may include a battery. Power storage device may include a capacitor; for instance, the power storage device may include an ultra-capacitor. Power storage device may include a magnetic power storage device, such as a device that incorporates an inductor. In some embodiments, power source 124 includes a photovoltaic device; the photovoltaic device may be any device that converts light to electric power. Power source 124 may include power provided by an electrical network, for example including electric power accessed via a wall-plug; the electrical power may be alternating current "mains" power, or power generated by solar panels, wind turbines. Wireless receiver 104 may charge wirelessly; for instance, the wireless receiver 104 may charge inductively. Wireless receiver 104 may include an inertial power source that generates mechanical or electrical power from movement of wireless receiver 104, including without limitation an inertial power source that generates power from walking or swinging a cane on which inertial power source is mounted.

With continued reference to FIG. 1, wireless receiver 104 is configured to receive a signal from at least one first transmitter 128. In some embodiments, where at least one first transmitter 128 includes a passive transmitter as described in further detail below, wireless receiver 104 may receive the signal by producing an interrogation signal using an interrogator, and receiving the signal generated by the passive transmitter in return. In other embodiments, where at least one first transmitter 128 includes an active transmitter as set forth in further detail below, wireless receiver 104 listens for the transmission frequency of at least one first transmitter 128 and inputs the signal upon receiving the signal output by at least one first transmitter 128. Wireless receiver 104 may exchange signals with at least one first transmitter 128; for instance, wireless receiver 104 may transmit a query to at least one first transmitter 128 and receive data in response to the query. Wireless receiver 104 may similarly receive a signal from a second transmitter or from additional transmitters situated in a navigable space, as described in further detail below. Wireless receiver 104 may be configured to receive content data from at least one first transmitter 128 or a second transmitter. Wireless receiver 104 may be configured to receive product data from at least one first transmitter 128 or a second transmitter.

Alternatively, or additionally, and still referring to FIG. 1, wireless receiver 104 may have a code reader. In some embodiments, a code reader may be any device capable of reading a visual code such as a UPC laser-scanned code or a quick read ("QR") code. In some embodiments, the code reader is a laser scanner. In other embodiments, the code reader is an optical device such as a camera; for instance, where wireless receiver 104 is a mobile device such as a mobile phone or tablet, or is coupled to such a device, the code reader may be the camera of the mobile device. The mobile device may be configured to input a QR or UPC code using the camera and then extract the data contained in the code using software. In any embodiment of methods, systems, and/or devices described herein in which wireless receiver 104 receives a return signal including a unique identifier and processes that return signal, wireless receiver 104 may similarly obtain the unique identifier by way of a code reader, and process the unique identifier in a like manner.

With continued reference to FIG. 1, at least one first transmitter 128 may be any device that outputs a signal using electromagnetic radiation; the signal may be sent using any frequency usable in communication, including without limitation radio waves, micro waves, infrared waves, and visible light. At least one first transmitter 128 may include an antenna 132. At least one first transmitter 128 may include a passive transmitter, such as those used for passive radio frequency identification ("RFID") or near field communication ("NFC") tags. In some embodiments, passive transmitter includes an antenna 132 in which electric current is induced by magnetic coupling from an antenna, such as antenna 108 of wireless receiver 104; the induced electric current may power the passive transmitter, which may use additional circuitry such as a logic circuit 136 to analyze the signal and generate a response signal. Logic circuit 136 may be any logic circuit as described above regarding driver circuit 116.

Still referring to FIG. 1, response signal may be output by the same antenna 132. The response signal may be output by an additional antenna; in other words, as described above for wireless transmitter 104, antenna 132 may include multiple antennas. In some embodiments, the passive transmitter has a plurality of antennas to enable the transmitter to capture the signal optimally from a plurality of angles. The signal from the interrogator may contain no information, functioning solely to activate the passive transmitter. In other embodiments, the signal from the interrogator contains information that circuitry in the passive transmitter processes.

Continuing to refer to FIG. 1, at least a transmitter 128 may include an active transmitter. Active transmitter may be a transmitter having a power source 140 other than an interrogation signal; power source 140 may be any power source 124 as described above. Active transmitter may use the antenna 132 to broadcast a signal periodically. Active transmitter may use the antenna 132 to listen for incoming signals, and transmit in response to a detected signal. Active transmitter may perform both actions; for instance, active transmitter may periodically transmit a first signal, and also transmit one or more second signals in response to signals at least a transmitter 128 receives. At least a transmitter 128 may include a transceiver 144, which may be any transceiver 112 as described above. At least a transmitter 128 may include a beacon using any beacon protocol as described above.

With continued reference to FIG. 1, at least a transmitter 128 may include one or more sensors; for instance, at least a transmitter 128 may include a user presence sensor 148, which may be a sensor that detects when a user is in a particular location, such as within a navigable space, within a particular portion of a navigable space, at a user feature, or using a user feature, for instance as described in further detail below. User presence sensor 148 may be a motion sensor that detects the movement of a person in a particular location. User presence sensor 148 may be heat sensor that detects the body heat of a person in a particular location. User presence sensor 148 may be a field-interruption sensor that combines an emitter of radiation such as infra-red radiation with a sensor capable of detecting the emitted information; as a result, when a person is in a particular location, the emitted radiation may be blocked, causing the sensor to detect a change or cessation in detected radiation, indicating that a person is present. The user presence sensor 148 may function similarly to the user presence sensor used in automatically flushing toilets or urinals, in automatic faucets, and the like.

Still referring to FIG. 1, at least a transmitter 128 may include a memory 152. Memory 152 may be any memory as described below in reference to FIG. 8. In some embodiments, memory 152 is read-only. In other embodiments, memory 152 may be writable. The writable memory may require authentication; for instance, the writable memory may be writable only given a password, identifier, key, or other data indicating that the device that will be modifying the memory is authorized. Memory 152 may include any combination of the above; for instance, memory 152 may include a read-only section 152a. Memory 152 may include a writable section 152b with limited access. Memory 152 may include a writable section 152c with general access, to which any user may be able to write data. Memory 152 may include the read-only 152a section and the generally writable section 152c, or the limited access writable section 152b and the generally writable section 152c, or the read-only section 152a and the limited access section 152b. The limited access section may be limited to users of the system 100, or in other words may be generally writable, but only to users of the system 100, who may have the requisite access codes as a result of joining the system 100 as users; the users may alternatively be granted the access codes by the system 100 to update information on at least a transmitter 128 only when authorized by the system, and otherwise be unable to update the memory; in this way, the system 100 may be able to update information on at least a transmitter 128 memory 152 efficiently by way of the receiver while maintaining security against misuse of the memory. In some embodiments, preventing users from being able to write over memory 152 enables the memory to be free from intentional or unintentional corruption or inaccuracy, and enables the system 100 to ensure that certain information is always available to users of at least a transmitter 128. In some embodiments, writable sections 152b-c enable the system 100 itself or users of the system 100 to correct, augment, or update information as described in further detail below.

Figure 2:
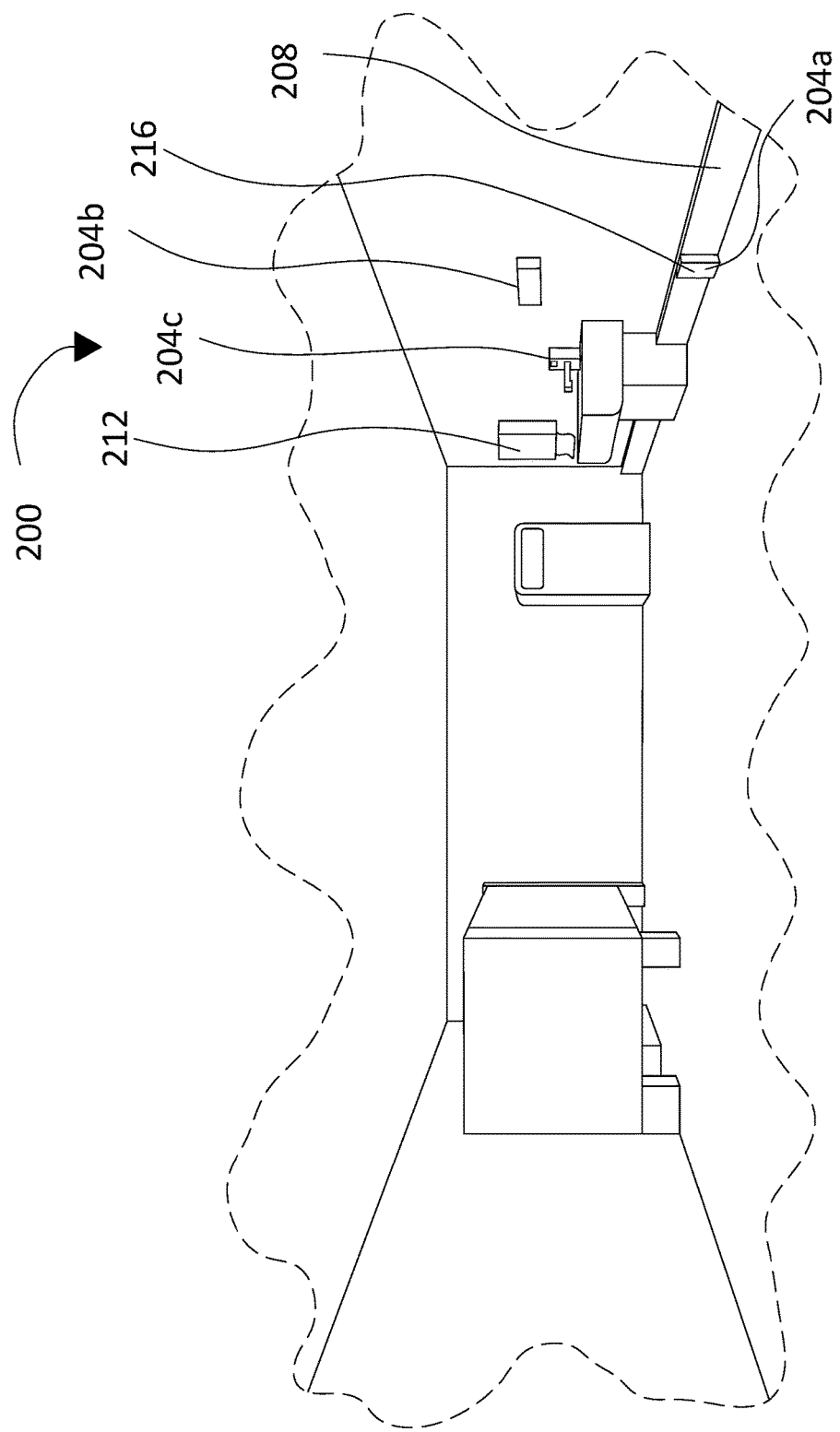
FIG. 2 is a schematic diagram illustrating an exemplary navigable space.

Referring now to FIG. 2, an exemplary embodiment of a navigable space 200 illustrated. At least one first transmitter 128 may be located at a location 204a-c in a navigable space 200. Navigable space 200 may be any space a user may wish to negotiate, including any outdoor or indoor space. Navigable space 200 may include without limitation a corridor, a room, an interior or exterior retail space, a restaurant dining area, a restroom, a trail, a parking lot, a road, a sidewalk, a park, or a vehicle such as a bus, train, aircraft, boat, ship, space vehicle, or space station. A navigable space 200 may contain other navigable spaces; as a non-limiting example, first navigable space may be a restaurant, within which a bathroom may be a second navigable space and a dining area may be a third navigable space. Further continuing the example, a toilet stall within the bathroom may be a fourth navigable space.

Continuing to refer to FIG. 2, navigable space 200 may contain architectural features 208, which may be features of the construction of navigable space 200 that serve purposes not directly related to user interaction, such as baseboards, walls, ceilings, molding, floors, floor tiles, and the like. Navigable space 200 may contain at least a user feature 212, which may be at least an object located in navigable space 200 for the purpose of user interaction; for instance, user features 212 may include without limitation sinks, toilets, toilet stalls, urinals, paper towel dispensers, hand driers, trash cans, automatic teller dispensers, doors, elevators, vending machines, fountain drink dispensers, ticket taking/dispensing devices, salad bars, or any other items a user would expect to interact with when using navigable space 200. A user feature 212 may include a free-standing device.

Still referring to FIG. 2, location 204a-c may include a location in or on an architectural feature 208 of navigable space 200; for instance, at least one first transmitter 128 may have a location 204a in a baseboard within a room, for instance as shown in FIG. 2. At least one first transmitter 128 may have a location 204a within molding. At least one first transmitter 128 may have a location within a wall, or within a recess in the surface of a wall. At least one first transmitter 128 may have a location mounted on a wall; for instance, location 204a-c may be a wall-mounting 204b, such as a wall-mounted box or sign (e.g., a building directory or an Americans with Disabilities Act ("ADA") sign), for instance as described in further detail below. Location 204a-c may be adjacent to a user feature 212. For instance, location 204b may be located adjacent to a sink. In some embodiments, location near to a user feature 212 allows the user or the system 100 to determine location of the user feature 212. In some embodiments, location 204a-c is a location 204c at a user feature 212 of navigable space 200; for instance, at least one first transmitter 128 may be attached to the user feature 212. At least one first transmitter 128 may be incorporated in the user feature 212.

With continued reference to FIG. 2, location 204a-c may be fixed. A location may be fixed if it does not change position during typical use of navigable space 200. For instance, if location is within a fixture in navigable space 200, location may be unlikely to change position. Likewise, if location 204a-c is incorporated or attached to a trash can, although the trash can may be moveable, it may be likely to remain in more or less the same part of a room during typical use; for instance, the trash can in some bathrooms is more or less invariably located beneath or beside a paper-towel dispenser. Further examples of fixed locations include, without limitation, a baseboard at a wall corner such as a corner at intersecting corridors, the front or bottom edge of a countertop such as the front or bottom edge of a countertop in front of a user feature, on a wall at the end of a countertop, on the face of or underneath a countertop at a sink, at the back of a stall at door or eye level, at the back of a stall door away from the toilet, and the bottom corner of a door (for instance at the strike or handle side); the door used for location 204a-c may be an entrance or exit door. In some embodiments, where location 204a-c is fixed, the position of the fixed location 204a-c within navigable space 200 may be used to determine the position, orientation, or both of the user within navigable space 200, as set forth in further detail below.

Still referring to FIG. 2, at least one first transmitter 128 may alternatively or additionally be located in a non-fixed location. The non-fixed location may be a location that is not necessarily predictable or affixed to a feature of navigable space 200; the non-fixed location may nevertheless be likely to be within navigable space 200. For instance, the non-fixed location may be in a trash can, a recycled paper or aluminum container, on a menu, or on a mop or other piece of equipment intended for use in navigable space 200.

Continuing to refer to FIG. 2, at least a transmitter 128 may communicate with at least a user feature 212. For instance, at least a transmitter 128 may be wired to a circuit in the user feature 212, such as a circuit containing a user presence sensor 148; as a non-limiting example, at least a transmitter 128 may be connected to a user presence sensor 148 incorporated in an automatically flushing toilet or urinal, and may receive a signal when the user presence sensor 148 detects a user is using the toilet or urinal. In other embodiments, at least one first transmitter 128 communicates wirelessly with a circuit in the user feature 215; for instance, at least one first transmitter 128 may receive a signal via the antenna 132 from the user feature. Further examples of interaction between at least a transmitter and at least a user feature are described below.

In some embodiments, the system 100 includes a surface feature 216 indicating location 204a of at least one first transmitter 128. The surface feature 216 may be a projection such as a "bump". The surface feature 216 may be an indentation. The surface feature 216 may include a sign such as an ADA sign or building directory. The surface feature 216 may be a region of the surface having a different texture from the surrounding surface. As a non-limiting example, where the at least one at least a transmitter 128 is located in a baseboard, the surface feature 216 may be a projection or indentation that a user is able to detect with the tip of a white cane as described in further detail below; in some embodiments, where wireless receiver 104 is only able to detect at least one first transmitter 128 at short range, the user may locate the surface feature to place the receiver in communication with at least one first transmitter 128.

In other embodiments, a surface feature 216 may be positioned or formed to be readily located using a user's hand. For instance, the surface feature 216 may be located on a countertop, sign, or other item located within the reach of a user during navigation or use of navigable space 200.

The surface feature 216 may have a specific shape, such as a raised 3-dimensional product logo or the like to identify location of the transmitter and distinguish it from other random "bumps". The surface feature 216 may also have a form recognizable to the user, such as a message in braille or a "bump dot" such as those often used by visually impaired persons to mark locations of important items.

Location 204a-c may alternatively be located at a consistent or predictable spot within navigable space 200, such as at a corner, at a doorjamb on a particular side of a door, or on a sign; location 204a-c may be at a consistent location within a sign such as the top center or the right end of a line of braille. Thus, a user utilizing the system 100 may locate at least a transmitter 128 by searching for either a surface feature 216 or for a known or predictable location within navigable space 200. This may aid the user or the system 100 or both in finding location and orientation of the user within navigable space 200.

Figure 3A:
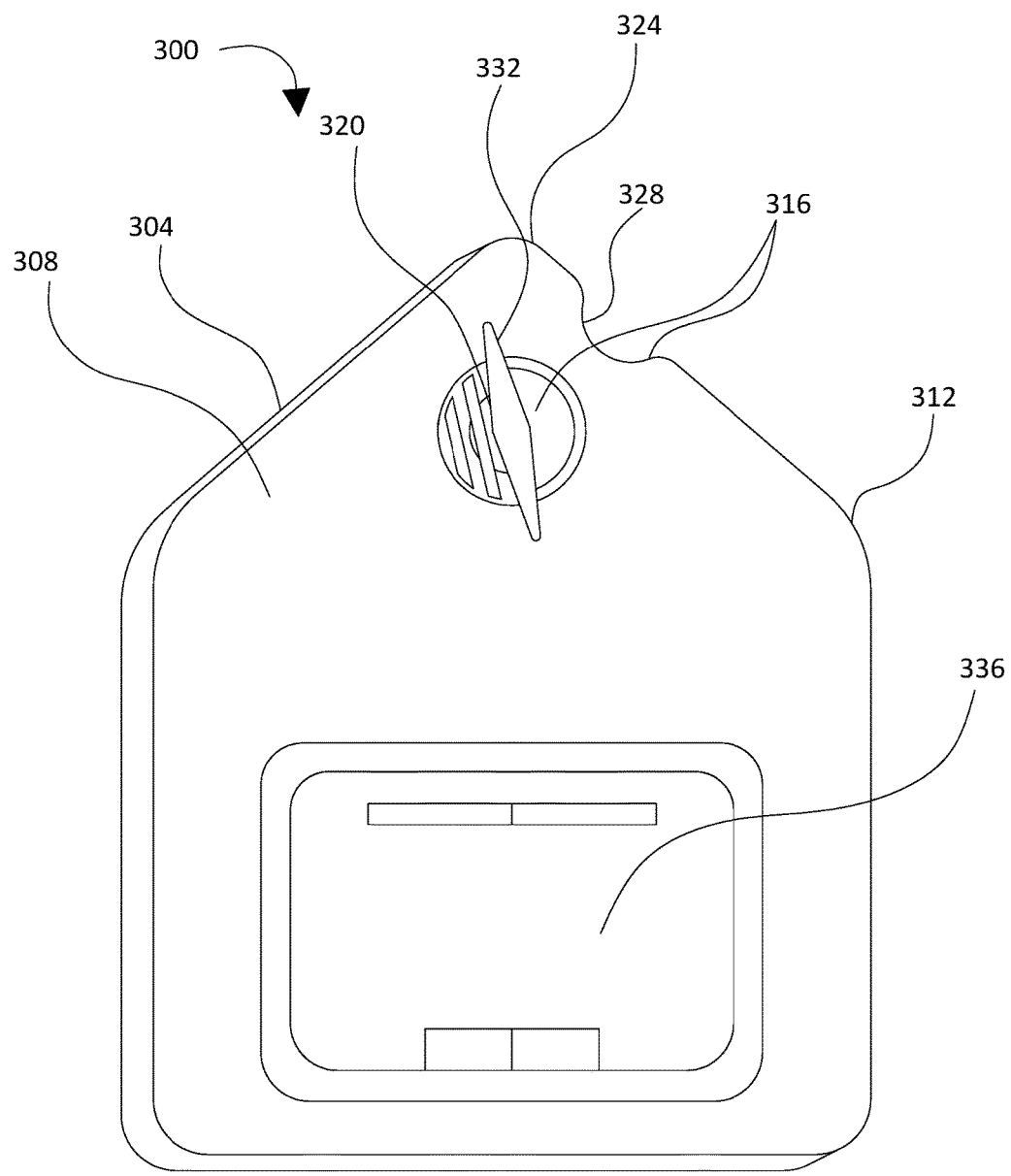
FIGS. 3A-B are schematic diagrams illustrating an exemplary embodiment of an assembly for combined tactile and wireless guidance.
Figure 3B:
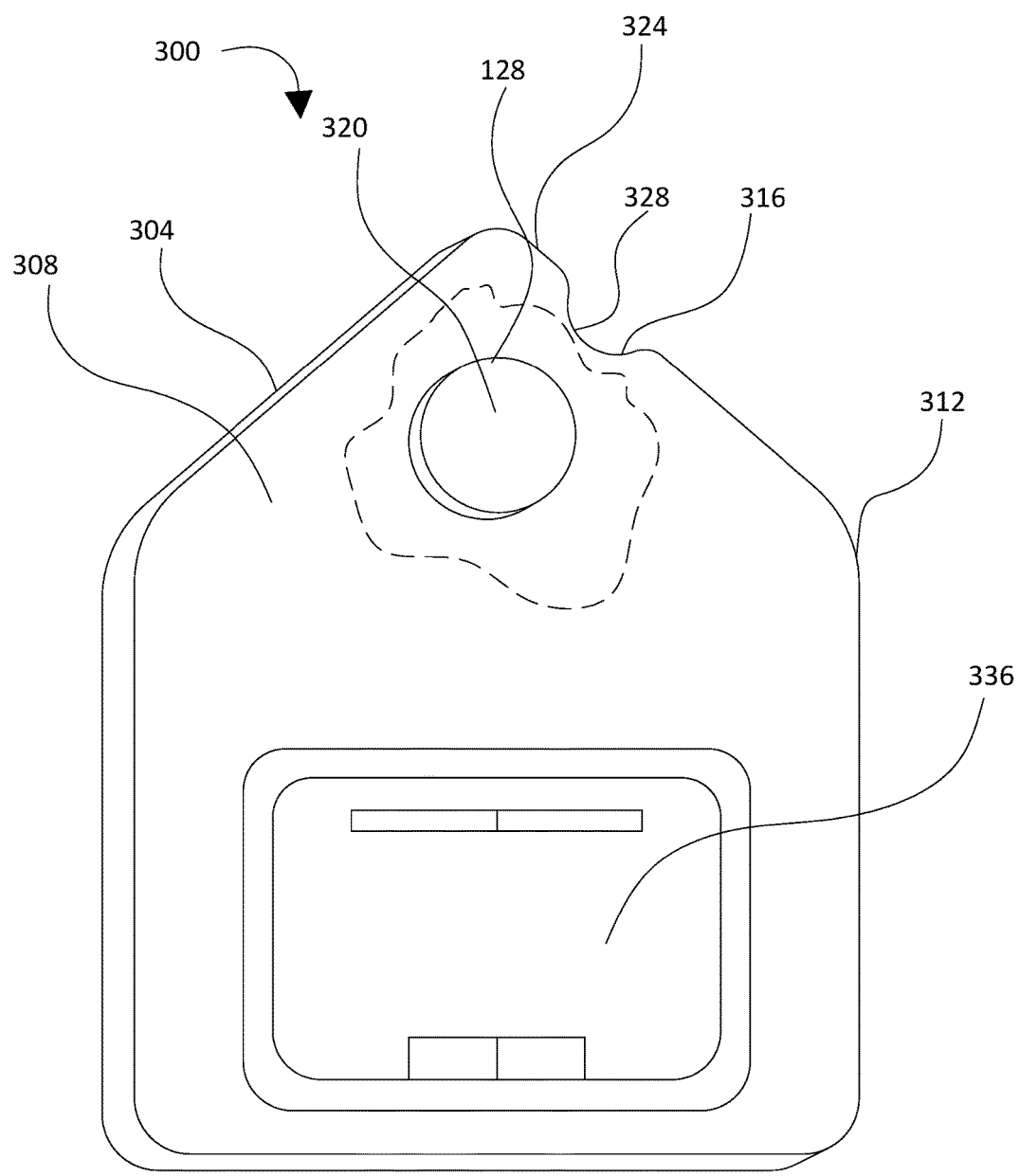

Referring now to FIGS. 3A-B, at least a first transmitter 128 may be incorporated in an assembly 300 for navigation and usage guidance in a navigable space using hybrid tactile and electronic guidance means. Assembly 300 may include a first informational object 304 installed at a fixed location in navigable space 200. First informational object 308 may include a sign, which may be an ADA sign. First informational object 308 may have any other three-dimensional form conducive to its use as described below, including a box, a pole, a projection from a wall, a door, or another architectural feature, or a portion of an architectural feature. First informational object 304 may be mounted to a vertical surface of an architectural feature. First informational object may include an obverse 308. Obverse 308 may include one or more surfaces accessible to the user; as a non-limiting example, where first informational object 304 includes a sign, obverse 308 may include a surface of the sign that bears indicia such as writing, braille, or tactile elements.

Still referring to FIGS. 3A-B, first informational object 304 may include a first touch-discernable feature 312 identifying the first informational object. Where first informational object 304 has an exterior edge, first touch-discernable feature 312 may include a touch-discernable feature of the exterior edge. A touch-discernable feature, as defined herein, may include any feature distinguishable from a surrounding substrate. A touch-discernable feature may include a texture that distinguishes the symbols from a surrounding substrate, such as a ridged, knurled, or otherwise rough texture on a smooth substrate, or a smooth texture on an otherwise rough substrate. A touch-discernable feature may have a different coefficient of static friction from the surrounding substrate. A touch-discernable feature may have a different coefficient of dynamic friction from the surrounding substrate. A touch-discernable feature may have different thermal properties from the surrounding substrate; for instance, either symbol or both symbols may conduct heat more or less readily than the substrate, allowing a user to detect the boundaries of the symbol by detecting apparently contrasting temperatures. A touch-discernable feature may have different electrical properties from the surrounding substrate. A touch-discernable feature may include a three-dimensional form, such as a relief, textured, or recessed form, or any combination thereof. First touch-discernable feature 312 may be an outer perimeter of a sign, from which it is possible to determine that the sign is a sign; outer perimeter may have a distinctive shape, or include one or more distinctive shapes, indicating to a user that it is a sign and/or that it is first informational object 308. First touch-discernable feature 312 may include a touch-discernable feature located on the obverse 304; for instance, first touch-discernable feature 312 may include a three-dimensional form located on the obverse. First touch-discernable feature 312 may include braille.

Continuing to refer to FIGS. 3A-B, assembly 300 may include a second touch-discernable feature 316 identifying a particular location 320. In an embodiment, second touch-discernable feature 316 is included in or on first informational object 304; particular location 320 may be a location on the obverse. Alternatively, first touch-discernable feature 312 may be located near to second touch-discernable feature 316 in a manner permitting detection of the former to aid in locating the latter; for instance, first touch-discernable feature 312 may be a baseboard marker as described above, with second touch-discernable feature located, for instance, vertically above baseboard marker at a height convenient for manual discovery. Alternatively or additionally, second touch-discernable feature 312 may be located in a particular location relative to an architectural feature such as a doorway, doorjamb, countertop, or the like. Second touch-discernable feature 316 may include any touch discernable feature suitable for use as first touch-discernable feature 312; in an embodiment, second touch-discernable feature may be distinct from first touch-discernable feature 312. First touch-discernable feature 316 may include a touch-discernable feature 324 adjacent to particular location 320. For instance, particular location 320 may be adjacent to a particular point 328 along an exterior edge of first informational object 304; second touch-discernable feature 316 may include a touch-discernable feature 324 of the exterior edge at the particular point 324 along the exterior edge. Alternatively or additionally, second touch-discernable feature 316 may include a touch-discernable feature 332 at the particular location; for instance, second touch-discernable feature may include a three-dimensional form 332 attached to the obverse at the particular location.

With continued reference to FIGS. 3A-B, and as shown in the partial cutaway in FIG. 3B, at least a first transmitter 128 may be embedded in the first informational object 304 at the particular location 320. Where at least a first transmitter 128 is a passive transmitter as described above, it may be possible to interrogate at least a first transmitter 128 only with an interrogator in close proximity to at least a first transmitter 128; the presence of second touch-discernable feature 316 may therefore enable a user, even a user who is blind or visually impaired, to locate at least a first transmitter 128 on first informational object 304, and interrogate first transmitter 128. This in turn may have the advantage of saving on power and maintenance: at least a first transmitter 128, being passive, may consume no power ordinarily, and may function for years without any maintenance whatsoever, while interrogators, such as wireless receiver 104, may require little power to induce current and produce return signal, owing to their use in close proximity with at least a first transmitter 128.

Still referring to FIGS. 3A-B, first informational object may include a third touch-discernable feature 336. Third touch-discernable feature 336 may have any form suitable for use as first touch-discernable feature 312 or second touch-discernable feature 316. Third touch-discernable feature 316 may identify navigable space 200; for instance, third touch-discernable feature 336 may include a symbol or set of symbols identifying the navigable space 200. Third touch-discernable feature 336 may identify at least a user feature within navigable space 200. Third touch-discernable feature 336 may include a tactile map of navigable space 200; tactile map may identify architectural and/or user features. Tactile map may identify locations of other assemblies, as described herein for assembly 300, within navigable space 200. Tactile map may identify locations of other transmitters within navigable space 200, which may have any form suitable for at least a first transmitter 128, and may be incorporated in navigable space 200 in any manner suitable for incorporation therein of at least a first transmitter 128.

Referring again to FIG. 1, at least one first transmitter 128 is configured to transmit a signal. Signal may be a return signal in response to a prompt by another wireless communication device, including without limitation wireless receiver 104. Signal may be a return signal in response to interrogation by an interrogator included in another wireless communication device, including without limitation wireless receiver 104. Signal may be any wirelessly transmitted signal, including without limitation any signal transmitted through electromagnetic radiation, magnetic coupling, capacitive or other electronic coupling, or any other wireless means. Signal may include a unique identifier; unique identifier may identifier at least a first transmitter 128, a feature, including without limitation a user feature as defined below, adjacent to or attached to at least a first transmitter 128, or a feature, including without limitation a user feature, otherwise associated with at least a first transmitter 128. As a non-limiting example, at least a first transmitter 128 may include a set of transmitters adjacent to or attached to a user feature, defining a path to a user feature through a navigable space 200 as defined in further detail below, or the like, and all sharing the same unique identifier that is unique to the user feature; alternatively, each transmitter of at least a first transmitter 128 may have a unique identifier of its own. Unique identifier may take the form of any identifier that uniquely corresponds to at least one first transmitter 128 for the purposes of the system 100; this may be accomplished using methods including but not limited to Globally Unique Identifiers (GUIDs), Universally Unique Identifiers (UUIDs), or by maintaining a data structure, table, or database listing all transmitter identifiers and checking the data structure, table listing, or database to ensure that a new identifier is not a duplicate.

With continued reference to FIG. 1, signal may include other data in addition to unique identifier. For instance, and without limitation, at least one first transmitter 128 may be configured to transmit one or more elements of wayfinding data. In some embodiments, wayfinding data is any data that can be used by a user to navigate or use navigable space 200 as defined in further detail below, or to navigate between navigable spaces. Wayfinding data may include any data that aids a user in the use, identification, or understanding of items within navigable space 200. Wayfinding data may include any information needed to navigate through navigable space 200. For instance, wayfinding data may identify landmarks that a visually impaired person is able identify, and provide information about location of those landmarks. Wayfinding data may include tactile architectural features, sounds, or smells that may aid a user in orienting or locating him or herself within navigable space 200 or between navigable spaces. Wayfinding data may include points along paths the user may be following to arrive at an intended spot; the data may include vectors or other information indicating to the user which direction to move in for a given purpose along a path at the path point.

Still viewing FIG. 1, wayfinding data may include feature data. Feature data may be data describing a feature, such as an architectural feature or a user feature as defined in further detail below. Feature data may include the height location of features; in other words, wayfinding data may indicate the vertical position of features or portions thereof. Wayfinding data may include the orientation of features. Feature data may include user feature data. User feature data is defined herein as any data describing user feature 212 or portions or contents thereof. User feature data may include operational data, defined herein as information required to complete operation of a user feature 212. Operational data may include location relative to the user or to a point in navigable space 200 at which the operation may be instigated or performed; for instance, wayfinding data may indicate to the user where to stand when using a sink, and where to reach to activate the sink's faucet. Operational data may indicate the orientation of a feature; for example, the wayfinding data may indicate which way the user interface of an ATM is facing. Operational data may include information about particular components of a user feature 212, such as the buttons on an ATM or the faucet and soap dispensers on a sink. Operational data may provide information concerning how to operate an item such as a vending machine. Operational data may include information needed to instigate the operation of a user feature, such as a method to follow to instigate operation; for instance, the operational data may indicate how to turn on a sink faucet so the water will flow. Thus, for example, where the user feature 212 is a sink, the wayfinding information may describe the device that controls the faucet, and how to operate that device; thus, for instance, a user may arrive at the sink knowing that water flows automatically if the user's hand is in front of it, or knowing that the user must twist, press, or pull a control to open the faucet. Use information may describe location of a soap dispenser, and the mechanism that causes the soap to dispense soap. Likewise, the use information may describe how to flush a toilet or urinal, and location of toilet paper relative to location of a toilet.

With continued reference to FIG. 1, user feature data may include a feature type; for instance, the user feature data may indicate whether a particular feature is a urinal, toilet, vending machine, elevator, or the like. User feature data may indicate the number of user features of a given type. User feature data may include state information concerning at least one feature of the navigable space. State information may be information that describes the current state of a user feature 212. The state information may describe whether the feature is occupied, for instance as detected by a user presence sensor 148. State information may indicate whether the user feature 212 is functioning. State information may indicate whether the user feature 212 is off or on; for instance, state information may indicate if water is flowing from a faucet, or a toilet has just been flushed. User feature data may include safety information, which may be any information related to the feature concerning matters that could affect user safety or security. As a non-limiting example, safety information may include information indicating that a microwave or stove is in use, that the floor is or may be wet, that a surface is slippery or presents a tripping hazard, that there is high voltage at or near the user feature 212, that there are currently moving vehicles nearby, or that a travel location for moving vehicles is nearby, and the like. Safety information may indicate the orientation relative to user feature 212 of hazards. Safety information may include instructions for avoiding hazards while using user feature 212. Safety information may overlap with state information; for example, whether a walk light is on or whether a stove or microwave oven is currently operational may be both state information and safety information. User feature data may include content data. Content data may be information indicating contents or components of user feature 212, such as ingredients of edible contents of a container or dispenser of food or drink, money contained in an ATM, and the like.

Continuing to refer to FIG. 1, wayfinding data may include the space type of navigable space 200; in other words, wayfinding data may indicate whether navigable space 200 is a restroom, elevator lobby, or other type of space. Wayfinding data may include space entry or exit locations, numbers and types; types may include, for instance, whether the exit or entrance is handicap accessible, whether it is a front door, and the like. Wayfinding data may indicate whether the transmitter is on a fixed or non-fixed item. Wayfinding data may indicate special navigational data concerning a particular item, such as whether an elevator is an express elevator that only goes to upper floors, or whether an escalator is currently running upward or downward. Wayfinding data may include information about the numbering or order of rooms or other spaces or features; for instance, wayfinding information may indicate whether to the left of the room in which the user is currently located are higher or lower number rooms. Wayfinding data may provide information concerning occupants and room numbers as presented in an office directory in a building lobby.

With continued reference to FIG. 1, at least a transmitter 128 may include other data in addition to wayfinding data. For instance, at least a transmitter 128 may include content data, which may be data indicating the contents of an item located at or near a feature. In some instances, as an example, the content data may indicate which sodas are dispensed by which specific soda dispensers at a fountain drink station. Content data may likewise identify item locations of containers at a condiment, salad bar or flatware station. Content data may identify the contents of fixed or non-fixed containers such as ketchup, mustard, mayo, or sauce dispensers or salt or pepper shakers. Similarly, content data may include data describing the contents of medicine bottles, rotating fork, spoon, knife dispensers, soap or hand sanitizer whether fixed or non-fixed), and any other item whose contents are not readily ascertainable from its outward appearance or shape.

Still referring to FIG. 1, other data that at least a transmitter 128 may include besides wayfinding data may be product data. Product data may include the identification of one or more products. Product data may include location of one or more products; for instance product data may include planogram data indicating the layout of products in a store or the like. Product information may also include ingredients of a product, including allergens and nutritional information. As a non-limiting example, product data may be UPC or SKU data.

Continuing to refer to FIG. 1, or instance, where navigable space 200 is a public restroom, wayfinding data may include information allowing the user to walk through the restroom. Wayfinding data may include information allowing the user to locate sinks, toilet or urinal stalls, paper towels or hand driers, or trashcans. Wayfinding data may include information allowing the user to use toilets, urinals, sinks, soap dispensers, paper towel dispensers, hand driers, or trash cans. The wayfinding data may include the identity of at least one first transmitter 128. The wayfinding data may include location 204*a-c*. The wayfinding data may include a location of at least one feature of navigable space 200; the feature may include an architectural feature 208. The feature may include a user feature 212. As a non-limiting example, the feature may include an obstacle that the user must navigate around. The feature may include an item the user could use while in navigable space 200, such as a sink or toilet. The feature may include both an obstacle and a feature the user might use; for instance location of a trash can that is between the user and a sink. In some embodiments, location of the feature includes a distance from the transmitter to the feature. In some embodiments, location of the feature includes an angle from a reference point, such as the wall, corresponding to the direction in which the feature may include located. In other embodiments, location of the feature is a location on a virtual map of navigable space 200 as described in further detail below in reference to FIGS. 5A-B.

Still referring to FIG. 1, wayfinding data may be organized according to one or more data structures; a data structure for this purpose is a standardized ordering of data according to particular categories. This ordering of data may be accomplished by any suitable means, including by organization within relational databases, organization using object oriented programming, organization into particular files, tables, or other data stores, and the like. For instance, wayfinding data used by the system 100 may include the identification of particular navigable spaces; the wayfinding data corresponding to each navigable space may be organized together so that accessing the identity of a particular navigable space enables the system 100 to retrieve information about the contents, layout, and use of navigable space 200. As a non-limiting example, each navigable space may correspond to an object or structure within object oriented programming, with the object contents organized according to different elements of navigable space 200; thus, architectural features included in navigable space 200 may be included in an element of the object corresponding to navigable space 200, and may be organized according to any suitable organization style, including in hierarchical or non-hierarchical data structures. Architectural features may be further organized into categories, such as walls, doors, toilet stalls, tables, and corridors. Continuing the example, user features included in navigable space 200 may be similarly included in elements of the object corresponding to navigable space 200. Navigable spaces within navigable space 200 may have corresponding elements within the object pertaining to navigable space 200. Navigable spaces may, as a non-limiting example, be stored in a tree structure so that physical navigation of the spaces or plotting of paths traversing navigable spaces to nearby or included navigable spaces corresponds to the traversal of the tree structure. Further discussion of data structures and virtual maps that may be used with device 100 may be found below.

With continued reference to FIG. 1, data to be transmitted by at least a first transmitter 128 may be stored on at least a first transmitter 128 in any format conducive to its storage and transmission. Data may be stored in binary form; the binary storage may be any encoding of information. Data may be organized into formats such as network packets, fixed-length strings, XML, or any other form. Persons skilled in the art, upon reading the entirety of this disclosure, will be aware of many different ways in which data may be stored on at least a first transmitter 128 and/or device 100.

Continuing to refer to FIG. 1, there may be a second transmitter 156. Second transmitter 156 may be any transmitter suitable for use as at least a first transmitter 128. Second transmitter 156 may be in a location; location may be any location suitable for use as a location 204*a-c* as described above. In some embodiments, the wayfinding data includes location of second transmitter; location may be recorded as described above in reference to location of a feature. Second transmitter 156 may be attached to a moveable item; for instance, second transmitter 156 may be attached to a container, such as a salt or pepper shaker or a condiment container; second transmitter 156 may be configured to transmit content data concerning the contents of the container, such as whether a shaker contains pepper or salt, or what condiment is inside of a condiment dispenser. Second transmitter 156 may be a product identifying tag; that is, second transmitter may be attached to, adjacent to, or otherwise physically linked to a product. Second transmitter 156 may be configured to transmit product data concerning the product. For instance, second transmitter 156 may transmit product identification according to a product classification system, such as the universal product code ("UPC") system. Second transmitter 156 may identify the product using a stock keeping unit ("SKU") or similar identifier. In some embodiments, second transmitter is a third-party product capable of transmitting to wireless receiver 104; in other words, the receiver may read or receive from a third-party transmitter as described in further detail below. Third-party transmitter may include, for instance, a beacon using any beacon protocol as described above.

Still referring to FIG. 1, second transmitter 156 may be a transmitter in the possession of a particular user. For instance, second transmitter 156 may be a transmitter the user can attach to an object of the user's choice. In some embodiments, the transmitter in the possession of the user is read-only, and transmits a particular identifier; the user may configure wireless receiver 104 or a computing device in communication with wireless receiver 104 to associate the identifier with specific information concerning the object to which it is attached, or to a location in which the transmitter in possession of the user is placed. Thus, the user may attach second transmitter 156 to a household or office item such as a refrigerator or computer that the user would like to be able to locate or use, and enter data in the system 100 concerning the household or office item. Second transmitter 156 may have writable memory, in which case the user may be able to enter information in the memory of the transmitter 156 concerning the object to which second transmitter 156 is attached or location in which second transmitter 156 is placed.

With continued reference to FIG. 1, device 100 includes a portable computing device 160. Portable computing device 160 may be any computing device as described and defined below in reference to FIG. 8. Portable computing device 160 may be any computing device that may be carried on the person of a user. Portable computing device 160 may include, without limitation, a mobile device such as a mobile phone, smartphone, tablet, or personal digital assistant, or may be incorporated in a special-purpose device having features of device 100 as described herein. Portable computing device 160 is coupled to wireless receiver 104. Portable computing device may be electronically coupled to wireless receiver 104, and/or in wireless communication with wireless receiver 104; portable computing device may perform wireless communication with wireless receiver 104 using any suitable protocol, including without limitation BLUETOOTH protocols as described above.

Still referring to FIG. 1, portable computing device 160 may be designed and configured to parse the first signal for at least a textual element. At least a textual element may include any datum or data that may be rendered as text, including without limitation numerical text, as any character or string of characters in any written language, as any punctuation, diacritical symbols, or other markings associated with any form of written text, and the like. Textual data may include the unique identifier.

Continuing to refer to FIG. 1, portable computing device 160 may be configured to identify, in a first data structure linking the unique identifier to a map of navigable space 200, the first location and a second location of a user feature. Map may be an electronic or virtual map. Virtual map may contain the dimensions of the navigable space 200. Virtual map may contain location of at least one first transmitter 128 within the navigable space 200. Virtual map may contain location of a second transmitter 156 within the navigable space 200. Virtual map may contain locations of architectural features 208 within the navigable space. Virtual map may contain locations of user features 212 within the navigable space.

With continued reference to FIG. 1, virtual map may include one or more coordinate systems to aid in orientation and location detection and route calculation. The coordinate system may include a Global Coordinate System (GCS); in some embodiments, the GCS is a coordinate system orienting and locating navigable spaces 200, users, and features to a global set of axes. The global axes may be directional axes used to navigate the surface of the Earth, such as latitude and longitude. For example, a first global axis, which may be labeled the Y axis, may be oriented north-south, with north being the direction of the positive Y axis and south the direction of the negative Y axis. Likewise, a second axis, which may be the X axis, may be oriented east-west, with east in the direction of the positive X axis and west in the direction of the negative X axis. Up and down may correspond to a third axis, which may be the Z axis, with up positive for the Z axis and down negative for the Z axis.

Still referring to FIG. 1, in some embodiments, the coordinates include a User Coordinate System (UCS) for each navigable space 200. The UCS for a given navigable space 200 may have an origin point at a fixed location within the navigable space 200; for instance the origin point may be located at the strike or handle side of the entrance door of a room. The UCS may have three axes that span three dimensions. As a non-limiting example, a first axis, which may be the Y axis of the UCS, may be oriented in a first horizontal direction. In some embodiments, the first horizontal direction is a direction that is relatively simple to determine from location of the origin and the physical characteristics of the surrounding features; for instance, where the origin is located at a door in the navigable space 200 or at a wall of the navigable space 200, the Y axis may be perpendicular to the door or wall. The direction along the Y axis projecting into the navigable space 200 may be positive. Further continuing the example, the UCS may include a second axis, which may be the X axis, in a second horizontal direction such that the Y and X axes together span the horizontal plane; the X axis may be perpendicular to the Y axis. The X axis may be aligned in a direction determinable by the physical characteristics of the features near the origin of the UCS; for instance, where the Y axis is perpendicular to a wall or door, the X axis may be parallel to the wall or door. The UCS may include a third axis, which may be the Z axis, such that the Y, X, and Z axes together span three dimensions; the Z axis may be perpendicular to the Y and X axes, and thus vertical. In some embodiments, up is in the positive direction on the Z axis. Each UCS may have a specific relationship to the GCS that can be transposed when appropriate.

Continuing to refer to FIG. 1, in some embodiments, where one of at least one first transmitter 128 has a fixed location, at least one first transmitter 128 with the fixed location has its own UCS. The transmitter location may be the UCS origin. The UCS axes may be selected as described above. For instance, perpendicular to and into the face of the (wall mounted or feature mounted) fixed transmitter may be a positive Y axis communicated to the user as "straight ahead". A positive X axis may be 90 degrees to the right of the Y axis and may be communicated to the user as to the right. The transmitter UCS may have a specific relationship to its parent UCS and thus to the GCS. In some embodiments, the communications to the user are for the user when facing the transmitter (e.g., straight ahead, to the left, to the right turn around and proceed).

Still referring to FIG. 1, in some embodiments, the wayfinding data is stored using Building Information Modeling (BIM). In some embodiments, in a BIM, not only physical attributes such as location and size are stored, but any information about any feature (or space) is stored. BIM is a common term in the CAD world of the construction industry. As a non-limiting example, BIM data for a give user feature 212, architectural feature 208, or navigable space 200 may include the X and Y coordinates in a UCS, as described above. In some embodiments, this allows the calculation of distance to any other features UCS, even if that other feature is not in virtual map. The BIM data may include the X, Y, and Z orientation of the feature, with regard to the UCS, where Z describes the tilt of a feature. The BIM data may include a path tree connecting the feature to one or more other features as described above. The BIM data may include attributes of the feature, including without limitation the name and type of space (or subspace) in which the feature is located, the type of feature (e.g. toilet, sink, dryer, checkout counter, elevator), the operation (e.g. flush valve, nozzle, motion sensor, location of operation (e.g., top of countertop, wall, fixture mounted, free standing), Material covering surfaces (e.g. tile, carpet, stone, wood, or paint), color or distinguishing marks, or floors to which an elevator will travel. Part or all of virtual map may be stored at portable computing device 160 or at a remote device; a relevant portion of virtual map may be downloaded as needed, and as further described below in reference to FIG. 5.

With continued reference to FIG. 1, first data structure may include a table or similar structure linking unique identifier to a location in virtual map. First data structure may include a representation of navigable space. Representation of data in navigable space 200 may itself include a plurality of data elements that define specific spaces; for instance, where the navigable space 200 is a restroom, the data representation of that navigable space 200 may include the data representation of a navigable space corresponding to a toilet stall, another corresponding to its a sink and its accessories, and another corresponding to a diaper changing station, all within the restroom; the navigable space 200 data for the restroom may also include be linked to the navigable space data for a second restroom, an elevator lobby, a front entry, and for the building containing the restroom. This may be accessed by arrangement and traversal of a tree, or other data structure enabling recursive, linked, or serial enumeration of data structures, of navigable spaces, up to including buildings, blocks of buildings, campuses, or cities. In some embodiments, the data representation of each navigable space, whether it is a particular sink or toilet stall, a restroom, a building, or a city block, has a unique origin point corresponding to a specific location within the parent space of the navigable space, where the parent space is a navigable space including the navigable space; for instance, the parent space of a toilet stall may be a restroom, and the parent space of a restroom may be a building. As a result, if portable computing device 160 determines a user's current location in any navigable space within any other parent navigable space, specific information can be communicated to navigate to any other space within the parent navigable space, as all the origin points are connected according to the data representations. The representation of each navigable space may include an exit/entry point corresponding to a physical exit/entry point for the navigable space; for instance the exit/entry point may correspond to a door or to the point in front of a sink, urinal, ATM, or similar feature. Location of a navigable space's origin point or exit/entry point may be stored in the data representation of the parent space, or in a tree structure one node higher in the tree structure. In some embodiments, the exit/entry point of a given space must be traveled through physically to access data corresponding to the space (upon entry) or data corresponding to parent or sibling spaces (upon exit).

Still referring to FIG. 1, in some embodiments, data representation of each navigable space includes path data. Path data may be stored as one or more lists of specific points within a specific space; in some embodiments, the path data for a given point in the space includes a list of points that can be traveled to directly from each point while avoiding all obstacles will also be stored and associated with each point, where each point may correspond to a user feature 212, architectural feature 208, or navigable space within the navigable space 200. Path data may be represented as a path vector that includes the direction of travel to take along that path to get to the corresponding point, as determined from a particular orientation within the navigable space 200. Path data may further include data concerning landmarks that a visually impaired person can identify, such tile, carper, column, smells, sounds, and similar matters, which may be linked to each path point and vector. The combination of all such paths within the navigable space 200 may be organized within a path tree of navigable vectors linking all points within the navigable space 200. Each user and/or architectural feature may have a point or vector associated with it to connect to the path tree and thus all other features within that space; this may be done for user features 212, architectural features 208, or both.

Continuing to refer to FIG. 1, persons skilled in the art will be aware that the elements described above may be organized in other manners than in the object form described, as data may be organized in various ways depending on the programming language, protocols, or storage methods used, and other considerations; for instance, a relational database may arrange the data corresponding to each navigable space 200 in any manner using interrelated tables according to the dictates of efficient information storage and retrieval. Furthermore, information may be transferred from one form to another as convenient to the operation of the system; for instance, a single node in a tree structure corresponding to the navigable space 200 most immediately occupied by the user may be stored in a at least a transmitter 128 within that space, or may be conveyed to the receiver over the network in network packet form. Furthermore, the data may of course be stored according to any registry or other memory storage protocol within particular computing devices. Part or all of first data structure may be stored at portable computing device 160 or at a remote device such as a server or the like; a relevant portion of first data structure may be downloaded as needed, and as further described below in reference to FIG. 5.

With continued reference to FIG. 1, portable computing device 160 may be configured to retrieve, from a second data structure linking the feature to usage data for using the feature, the usage data. Second data structure may include any data structure linking an identifier of a user feature to usage data of the user feature, including without limitation a database table or other link. Part or all of second data structure may be stored at portable computing device 160 or at a remote device; a relevant portion of second data structure may be downloaded as needed, and as further described below in reference to FIG. 5.

In some embodiments, and still referring to FIG. 1, portable computing device 160 and/or a remote device contains data corresponding to a particular user. For instance, portable computing device 160 may have access to data describing the user's specific needs regarding navigation or user feature usage processes. As a non-limiting example, where the user has mobility issues, portable computing device 160 may have access to data describing the user's mobility issues; this data may be used to filter path information or usage sequences, as described in further detail below, for paths and sequences suitable for the user's mobility needs. Further continuing the example, portable computing device 160 may provide the user with accessible paths, for instance avoiding stairs in favor of ramps or elevators; portable computing device may direct the user to accessible features, such as toilets with support bars. In other embodiments, portable computing device has access to data describing the degree of the user's sensory impairment, if any; thus for example if portable computing device has data indicating the user cannot see well enough to read, portable computing device 160 will output information to the user utilizing a non-visual user interface device.

Continuing to refer to FIG. 1, portable computing device may have access, either locally or at a remote device, to a data structure linking user activities to categories of user features. Data structure linking user activities to categories of user features may include, without limitation, one or more database tables, a database, or any other suitable data structure. As a non-limiting example, a user activity may be stored in data structure as "use a urinal;" this may be linked in data structure to the categories "urinal," "bathroom," "sink," "toilet," "hand drier," and/or "paper towel rack," which may be user features and/or navigational features a user would utilize in a usage sequence involving using a urinal. Other activities may be linked in the data structure to other feature categories; as a result, portable computing device 160 may be able to retrieve a list of user features associated with a desired user action, as described in further detail below.

In some embodiments, the device 100 includes data indicating the degree to which a particular navigable space 200 uses the system including transmitters and devices such as device 100. For instance, a Level 0 space may have no transmitters 128, a Level 1 location may only have the transmitters installed in restrooms, a Level 2 location may have restrooms and major passageways such as corridors and elevator lobbies equipped with the system, and a Level 5 location may have every room equipped with the transmitters. In some embodiments, this information is provided to the user by portable computing device 160 using the user interface. The information may also be published generally, for instance in a website or similar format.

Still referring to FIG. 1, device 100 includes a user output component 164. User output component 164 may include a display 168; the display 168 may be any display as described below in reference to FIG. 8. The display 168 may be the display of a mobile device such as a smartphone or tablet. User output component 164 may include an audio output device 172, such as a speaker, headphones, or a wireless headset such as those typically paired to a mobile device. User output component 164 may include a tactile output device 176. In some embodiments, tactile output device 176 is a device that outputs information that is intelligible using the sense of touch. Tactile output device 176 may include a haptic output device such as a vibrator of a mobile device such as a smartphone, cellular phone, or tablet. In some embodiments, tactile output device 176 produces patterns having geometric forms that are intelligible to the user using the sense of touch; for instance, tactile output device 176 may output letters in braille using a set of retractable pins or bumps that can be extended and retracted to form braille characters, similarly to devices used with screen readers. Tactile output device 176 may output other recognizable shapes, such as directional arrows or geometric forms; tactile output device 176 may, as another example, output a map vignette of the immediate area including user features or any user feature data as described above. User output component 164 may be coupled to a mobile device; for instance, where device 100 and/or portable computing device includes a mobile device, user output component 164 may be coupled to the same mobile device. User output component 164 may be incorporated wholly or in part in a mobile device; for instance, user output component 164 may include the display and speakers of the mobile device, as well as a tactile output device coupled to the mobile device. User output component 164 may be coupled directly to wireless receiver 104. User output component 164 is configured to receive data from portable computing device 160; data may be received from portable computing device by any suitable electronic or wireless means. User output component 164 is configured to provide the received data to the user. In some embodiments, providing data signifies presenting the data to the user in a form in which the user can understand the data; for instance, if the user has some visual impairment but is capable of reading large type or similarly accentuated directional features such as large directional arrows, providing data may include displaying large type on a display 168, such as a mobile phone or tablet screen, or displaying large symbols such as directional arrows on the display 168. Similarly, if the user is visually impaired but able to hear, providing data may involve presenting the data by means of an audio output device 172. Where the user is not able to see or hear, presenting the wayfinding data may include providing data using a tactile device 221. Providing data may also involve a combination of the above-described means; for instance, the wayfinding data may be presented to the user in audio form, combined with large displays of directional arrows or type, or with tactile information. User output component 164 may also be able to output content data. User output component 164 may also be able to output product data.

Device 100 may include additional components. For instance, device 100 may include an inertial measurement unit (IMU) 180. IMU 180 may be an electrical component that detects the motion of the wireless receiver 104. IMU 180 may include, an accelerometer (not shown). IMU 180 may include a plurality of accelerometers disposed to detect acceleration in a plurality of directions; for instance, three accelerometers disposed in three directions spanning three dimensions may be able to detect acceleration in any direction in three dimensions. IMU 180 may include one or more gyroscopes. IMU 180 may include a plurality of gyroscopes disposed to detect rotation about a plurality of axes; for instance, three accelerometers having axes spanning three dimensions may be able to detect acceleration in any direction in three dimensions. IMU 180 may have both accelerometers and gyroscopes. IMU 180 may have any other component or components capable of detecting linear or rotational motion. In some embodiments, IMU 180 can determine substantially precisely the direction and magnitude of motion of the wireless receiver 104 relative to an initial reference frame and location; where the wireless receiver 104 is initially stationary, IMU 180 may enable the wireless receiver 104 to determine substantially accurately any change in orientation or position of the receiver. In other embodiments the receiver is coupled to an IMU 180; for instance, where the receiver is coupled to a computing device 120 such as a smartphone or tablet, the computing device 120 may have an IMU.

Device 100 may include a navigation facility (not shown), defined as any facility coupled to the computing device that enables the device accurately to calculate the device's location on the surface of the Earth. Navigation facilities may include a receiver configured to communicate with the Global Positioning System or with similar satellite networks, as well as any other system that mobile phones or other devices use to ascertain their location, for example by communicating with cell towers. Device 100 may use beacons for navigation, for instance determining its location by direction and strength of one or more beacon signals; directional information may be received as part of beacon signals. Beacons transmitting beacon signals may be calibrated by device 100, or by multiple such devices, as set forth in further detail below.

Figure 4A:
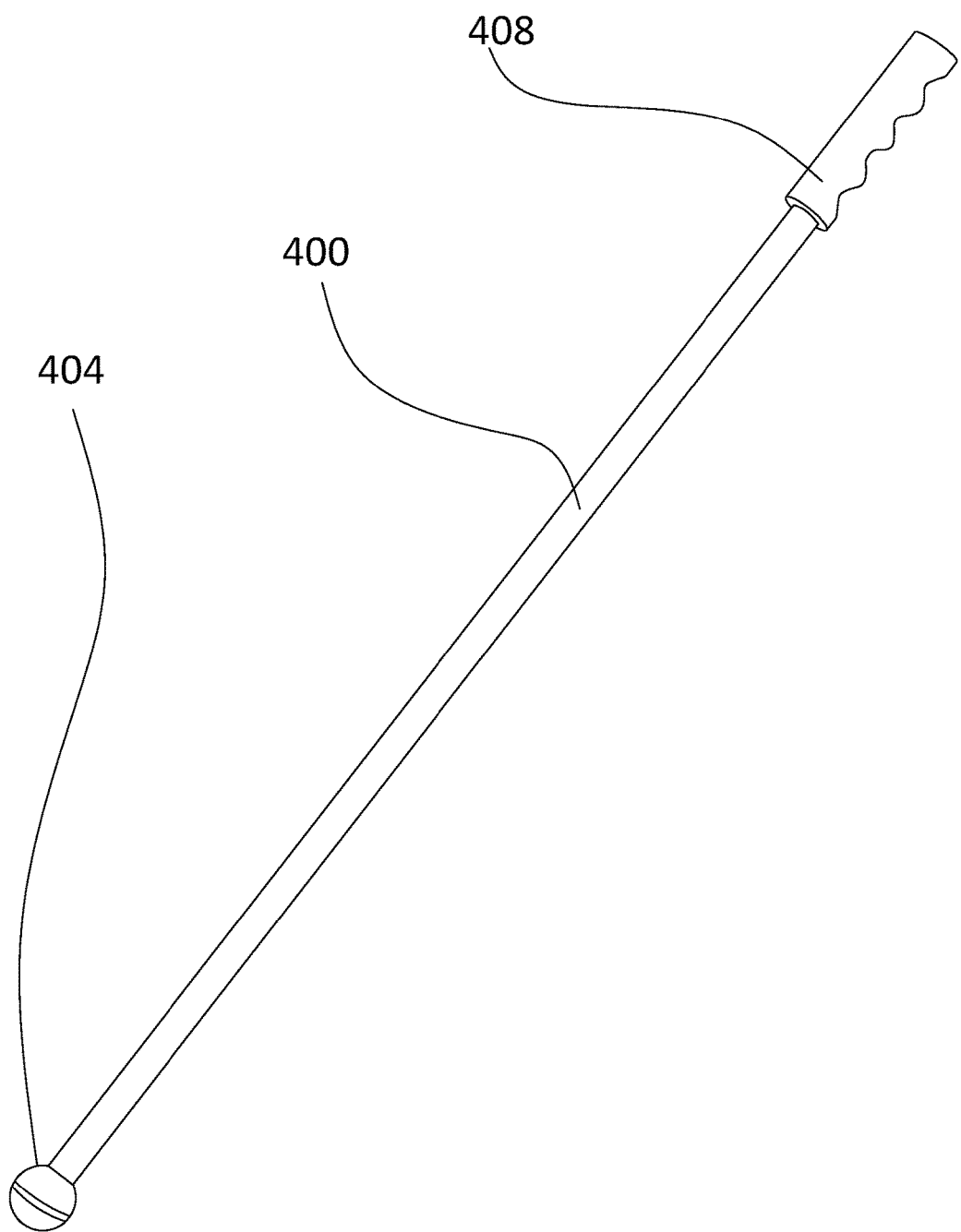
FIGS. 4A-C are schematic depictions of an exemplary embodiment of a wayfinding aid with incorporated receiver.
Figure 4B:
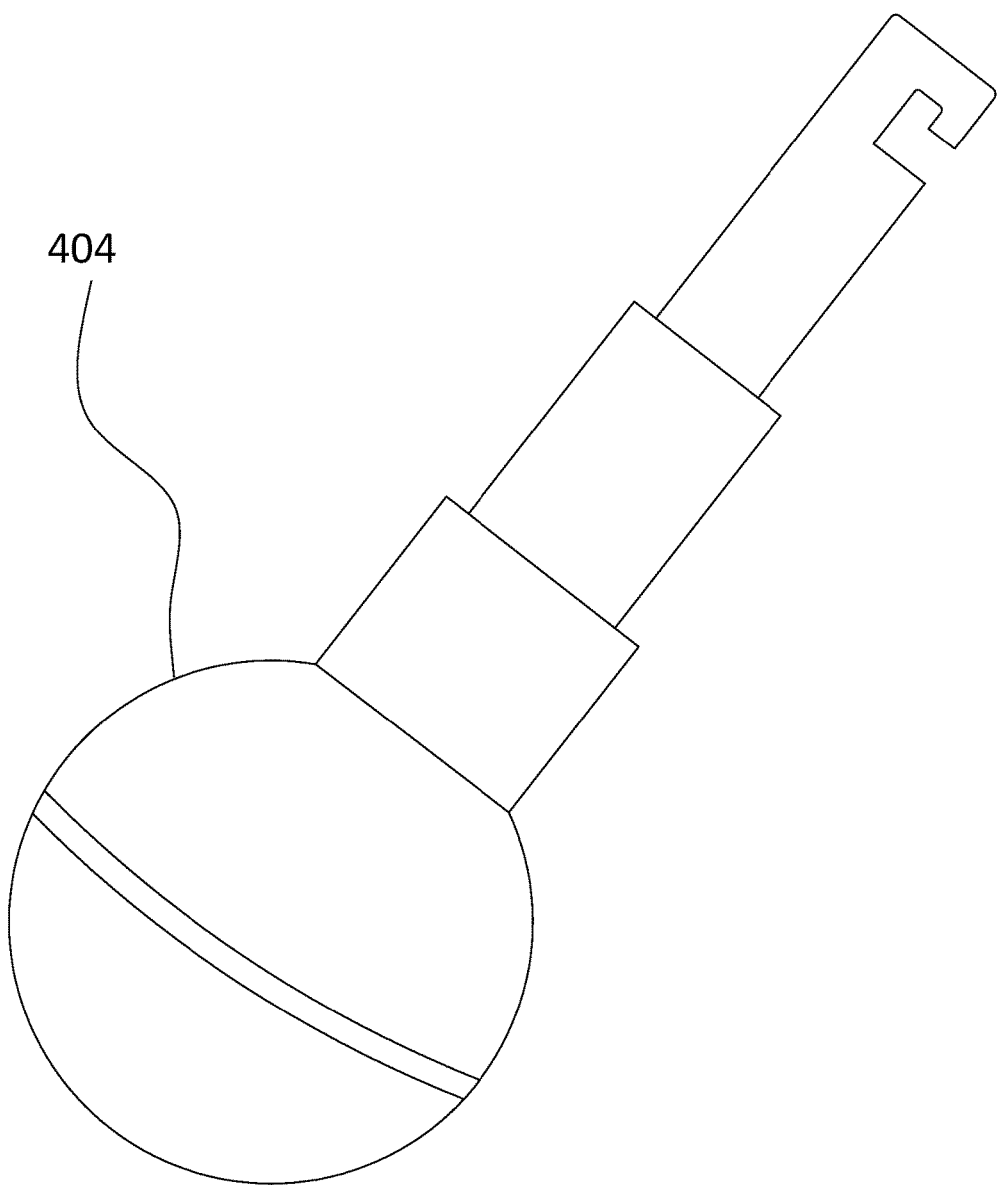
Figure 4C:
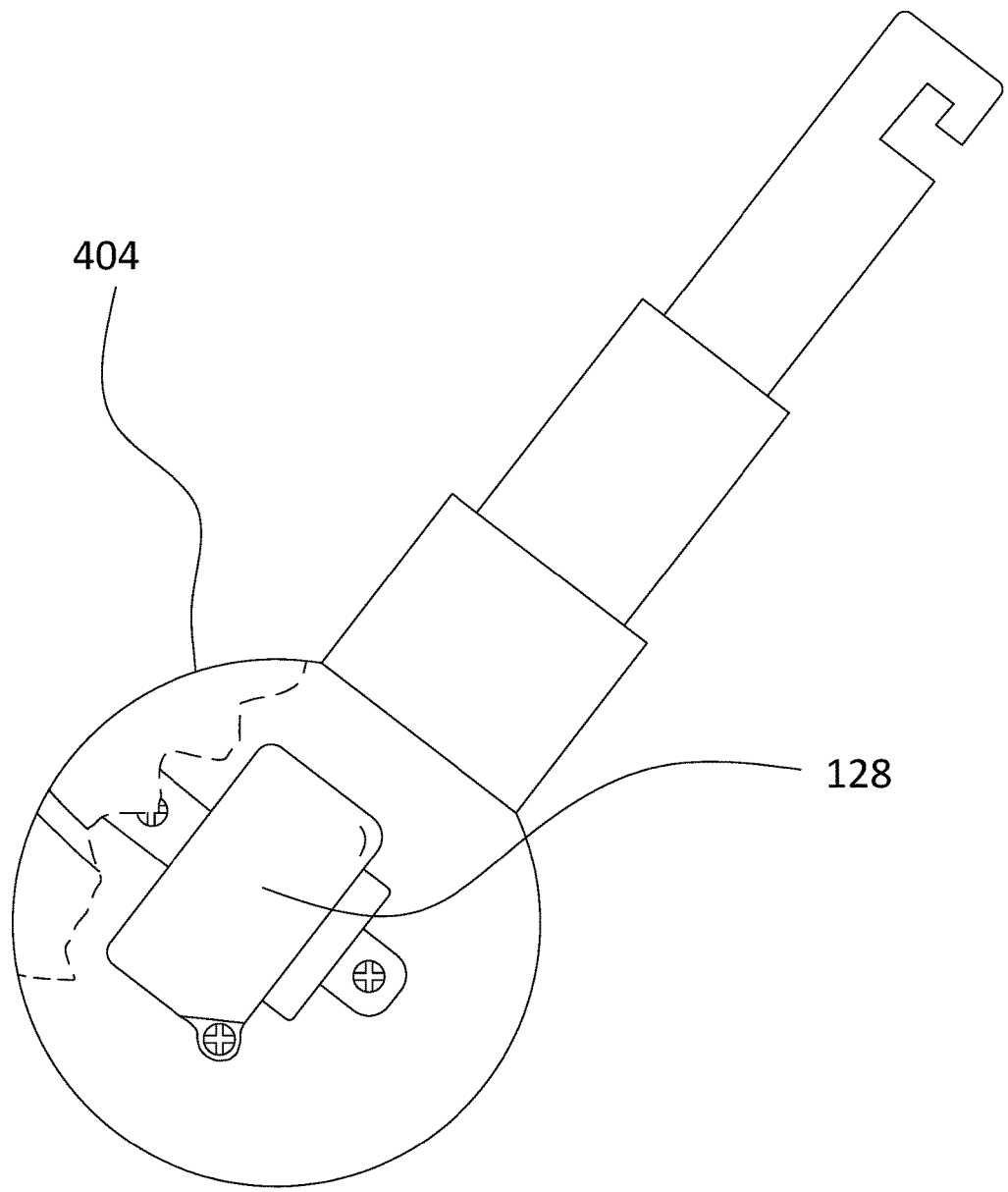

Referring now to FIGS. 4A-C, a non-limiting example of wireless receiver 104 incorporated in a wayfinding aid is illustrated. Wireless receiver 104 may be incorporated in or on a white cane 400. In some embodiments, a white cane 400 is an elongate object held in the hand of the user that is used to gather information such as to search out the path in front of the user for obstacles and guides to travel; for instance, white cane 400 may be used to feel for the wall of a corridor or room along which the user is travelling, to guide the user's path, or to feel for objects on the floor over which the user could trip. Wireless receiver 104 may be housed in the tip 404 of white cane 400, as shown for instance in FIG. 4C. The tip 404 of white cane 400 may be detachable; many white canes have tips that may be incorporated in the canes using a hook that attaches to an elastic cord within the cane, or a similar mechanism. The tip 404 may therefore be manufactured with wireless receiver 104 imbedded in the tip, and combined with any white cane 400 that admits interchangeable tips. Wireless receiver 104 may alternatively be located on a service animal; for instance, a service dog may have wireless receiver 104 on a bracelet near the animal's paw, which the dog can be trained to touch to a baseboard. Wireless receiver 104 may also be stored in an accessory on the person of the user, such as a ring, bracelet, necklace, or a prosthetic limb. Wireless receiver 104 may be stored in or on handle 408 of white cane 400. Wireless receiver 104 may also include one or more components to provide non-visual feedback to the user, including but not limited to a vibrator in or on handle 408 that vibrates to indicate reception of a signal from at least a first transmitter 128 and/or second transmitter 156. Wireless receiver 104 may be holstered to an object such as a cane handle, permitting it to be used separately from the wayfinding aid as well as while attached.

Still viewing FIGS. 4A-C, in some embodiments, wireless receiver 104 in white cane 400 enables a user to place wireless receiver 104 in close proximity to at least one first transmitter 128 when the user is searching out a path. For example, at least one first transmitter 128 may be located in a feature of the navigable space 200, and a receiver 204 in the tip 404 of the cane 405 may be brought into close proximity with the feature. In some embodiments, the user searches out a surface feature 216 near to at least one first transmitter 128, feeling for the surface feature 216 with the tip 404 of white cane 400. Transmitter 128 may be in a standard location relative to feature 216 such as directly above at a standard height or location such as on an ADA sign or under a countertop; transmitter 128 may be discoverable with a first or second touch-discernable feature as described above. In other embodiments, the user may find location by looking for a recognizable feature of the navigable space 200, such as a corner, door jamb, or similar feature. Wireless receiver 104 in the white cane may be connected to a computing device; for instance, wireless receiver 104 may be wirelessly paired to a mobile device such as a smartphone on the person of the user, to which wireless receiver 104 may relay wayfinding data, or other data such as content data or product data.

Figure 5:
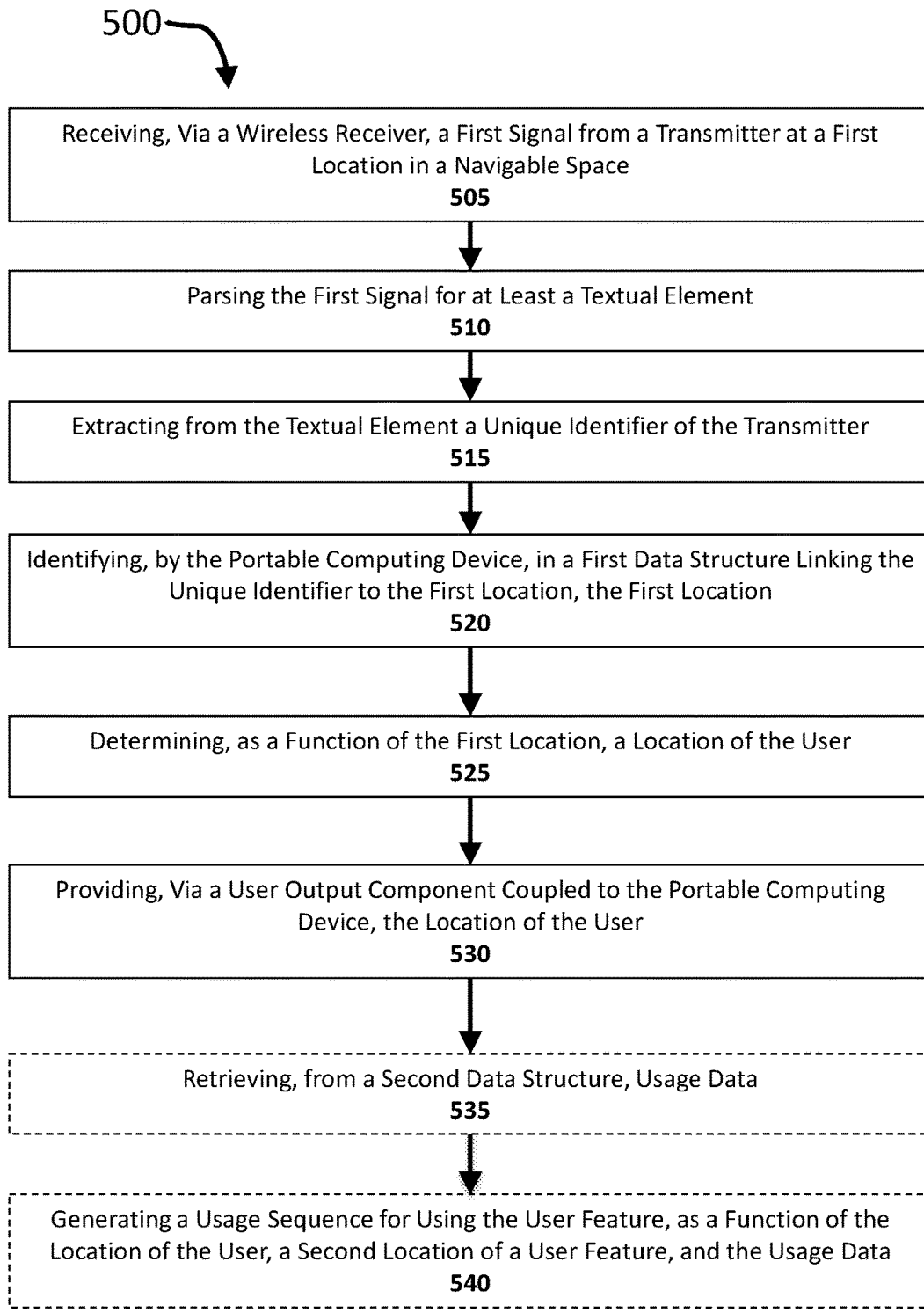
FIG. 5 is a flow diagram illustrated an exemplary method of navigation and usage guidance.

Referring now to FIG. 5, a method 500 of navigation and usage guidance in a navigable space is illustrated. At step 505, a portable computing device 160 coupled to a wireless receiver 104 receives a first signal from a transmitter 128 at a first location 204*a-c* in a navigable space. Wireless receiver 104 may receive the first signal from at least one first transmitter 128 by any means of wireless communication as described above, using the antenna 108. In some embodiments, wireless receiver 104 emits a signal to prompt at least one first transmitter 128 to send the first signal; wireless receiver 104 may send an interrogation signal, using an interrogator. In other words, wireless receiver 104 may receive first signal by wirelessly transmitting, via an antenna of the wireless receiver, an interrogation signal providing electrical power to the transmitter, and wirelessly receiving from the first transmitter, and via the antenna, a return signal. Wireless receiver 104 may send a plurality of queries, and at least one first transmitter 128 may send a series of sets of first signal in response. Wireless receiver 104 or a computing device 218 coupled to wireless receiver 104 may parse the first signal. Wireless receiver 104 or computing device 218 may organize the first signal into data structures, such as trees, lists, arrays, or tables of information, as described above in reference to FIGS. 2A-4D.

In an embodiment, and with continued reference to FIG. 5, device 100 may use one or more navigational facilities to locate at least one first transmitter 128. As a non-limiting example, device 100 may use GPS or other map-based programs to locate a building or other space containing at least one first transmitter 128. Device 100 may receive information on where to find at least a first transmitter from one or more beacons; device 100 may use signals from one or more beacons to determine an approximate position orientation of device relative to at least a first transmitter or to a virtual map indicating a location of at least a first transmitter 128. One or more beacons may be third-party devices; for instance, one or more beacons may be associated with a store, kiosk, or other location that provides beacons to aid in location thereof. Third-party beacons and/or transmitters may incorporated in virtual map during installation or subsequent use or update of system.

Still referring to FIG. 5, wireless receiver 104 may receive any first signal as described above in reference to FIG. 1. For example, wireless receiver 104 may receive a transmitter identity. Wireless receiver 104 may receive the fixed location of at least one first transmitter 128. Wireless receiver 104 may receive a location of at least one feature of the navigable space 200. Wireless receiver 104 may receive use information concerning at least one feature of the navigable space 200, as described above in reference to FIG. 1. Wireless receiver 104 may receive state information concerning at least one feature of the navigable space 200. Wireless receiver 104 may receive path information from at least one first transmitter 128. Wireless receiver 104 may receive a location of a second transmitter 156. Wireless receiver 104 may receive content information from at least one first transmitter 128. Wireless receiver 104 may receive product information from at least one first transmitter 128.

At step 510, and still referring to FIG. 5, portable computing device 160 parses first signal for at least a textual element. Where first signal is in digital form, portable computing device may interpret a digital sequence contained within first signal by rendering it according to an encoding method for one or more data types; for instance, portable computing device 160 may divide a string of binary digits into fixed-length blocks, such as bytes of data, and map those blocks to a data type encoded by those blocks, according to any suitable protocol. As a non-limiting example, portable computing device 160 may interpret a binary string as character data. First signal may be received in a particular format, such as one or two packets; persons skilled in the art, upon reading the entirety of this disclosure, will be aware of many ways in which first signal may be encoded, transmitted, received, and decoded.

At step 515, with continuing reference to FIG. 5, portable computing device extracts a unique identifier of the transmitter from the at least a textual element. At least a textual element may implement a protocol whereby one or more fields or elements are labeled, such as, without limitation, XML or packet-based protocols. At least a textual element may implement a protocol whereby fields in a prescribed order are separated by delimiter characters, which may be otherwise unused, such as commas in comma separated value (CSV) files. At least a textual element may be ordered in a strict character-count order, in which unique identifier is always found a particular number of characters from an endpoint, and has a length of a particular number of characters. Portable computing device 160 may be configured to identify and copy unique identifier according to any protocol in which at least a textual element is encoded.

Still referring to FIG. 5, portable computing device 160 may extract at least an additional datum. At least an additional datum may include any additional data described above in reference to FIGS. 1-4C, including without limitation wayfinding data, feature data, user feature data, or usage data; extraction and presentation of usage data is described in further detail below. At least an additional datum may include user-submitted data, which may have been written to a writeable section 152c of memory as described above. Portable computing device 160 may provide the at least an additional datum to the user via the user output component; at least an additional datum may be provided with a usage sequence as set forward in further detail below, or may be provided separately.

At step 520, and continuing to refer to FIG. 5, portable computing device 160 identifies first location in a first data structure linking the unique identifier to the first location. Portable computing device 160 may identify first location by querying the first data structure for the unique identifier, for instance where the first data structure has indexing by identifiers. Portable computing device 160 may identify first location by traversing first data structure and comparing entries to unique identifier; for instance, where first data structure includes a tree structure as described above, portable computing device 160 may traverse the tree structure and compare entries at nodes of tree structure to unique identifier. Traversal may commence at a point in first data structure based on previous activities performed by or with device 100. For instance, user may have scanned a previous transmitter at a root node of a navigable space containing navigable space 200; transmitter at root note, may, for instance, be located at an entry way to navigable space. Device 100 may have performed one or more elements of this method to arrive at first transmitter 128; for instance, a set of navigational instructions or a usage sequence may have guided the user to first transmitter 128. Portable computing device 160 may explore child nodes of root node (which, it should be emphasized, may be a root node of a larger tree); alternatively or additionally portable computing device 160 may explore nodes that virtual map indicate are within a distance user may have traversed since the last-scanned node, and may traverse in any direction along first data structure from such nodes. Similarly, portable computing device 160 may obtain an estimated location for user, near which to search for nodes, based on navigational data user may have been following, data from an IMU 180 indicating direction and length of travel from a known location, such as another approximate location or another transmitter, approximate user location obtained from a navigational facility such as GPS, or any combination thereof. Restricting traversal to estimated or known user location information may have the benefit of more rapid retrieval by restricting the space to be searched in first data structure. Data structure may include a data structure linking unique identifier to a map of navigable space as described above in reference to FIGS. 1-4C.

Continuing to refer to FIG. 5, portable computing device 160 may obtain a second location of a user feature. The second location may be obtained in a number of ways. For example, and without limitation, identifying the second location may involve receiving a user instruction, selecting an identification of the user feature from a plurality of identifications of user features as a function of the user instruction, and identifying the second location in the map using the identification of the user feature; identification of user feature may be stored, for instance, in first data structure, such as in another node of the type containing identifiers of transmitters, or in a node of a distinct type within the same tree or other data structure. In one embodiment, the user instruction may contain the identification of the user feature; for instance, a list of features in navigable space may be presented to the user, for instance as a "drop-down menu" or an equivalent provided by audio means. User may select, via an input device of user output component 164 or portable computing device 160, an item from that list; list may correspond to an enumeration of items linked to identifiers.

Still referring to FIG. 5, portable computing device 160 may select the identification of the user feature by determining an identification of a category of user feature as a function of the user instruction, identifying at least an identification of a user feature of the plurality of identifications of user features, the at least an identification matching the category, and selecting the identification of the user feature from the at least an identification. For instance, user instruction may specify the category of user feature. As a non-limiting example, a set or list of categories of features may be presented to the user, from which the user selects a desired category; the set or list may be presented similarly to the set or list of user features in navigable space 200. The set or list may be restricted to categories available in navigable space. Alternatively or additionally, user may say or enter a word or phrase that is linked to a user category in a data structure such as lookup table. The user instruction may indicate a desired action, and the portable computing device 160 may identify the category using the desired action; in an embodiment, this may be performed by matching the desired action to one or more categories of features based on a data structure linking actions to features as described above in reference to FIGS. 1-4C.

With continued reference to FIG. 5, portable computing device 160 may select the identification of the user feature from the plurality of identifications of user features further by computing a distance from the user location to each user feature identified by the plurality of identifications of user features and determining that the distance to the user feature is the smallest distance. Computing the distance may be performed by obtaining the location of the user feature corresponding to each identification of the plurality of identifications from virtual map, and obtaining or computing path information from first location to each such location; the traversal distance of each such path information may be calculated and compared, and the identification corresponding to the minimal traversal distance may be selected by numerical comparison. Alternatively or additionally, portable computing device 160 may select the identification of the user feature from the plurality of identifications of user features by determining that the user feature is unoccupied. For instance, where wireless receiver 104 communicates with a transmitter at a user feature possessing a user presence sensor 148, portable computing device 160 may select an identification corresponding to a user feature having a user presence sensor indicating the user feature is currently unoccupied; portable computing device 160 may select from a plurality of such unoccupied features by minimal path distance, as described above. In some embodiments, a device having a user presence sensor may be able to detect that a user is present, but not when a user has vacated the device; for instance, a toilet stall may detect when a user gets to his or her feet, but not when the user leaves the stall. Detection that the user feature is unoccupied may include cessation of detection of occupancy. Detection may further include association of cessation of detection of occupancy with information concerning the probability of subsequent vacation by a user, such as a typical time after cessation that a user would leave the user feature; this information may be entered by one or more users. As a non-limiting example, cessation of detection of a user may trigger a countdown of a certain number of seconds after which device 100 may conclude the user likely vacated; where device 100 is providing navigational directions to user device, likely time of navigation may be taken into account, for instance by determining that the countdown is likely to be complete when the device 100 arrives at the user feature, and thus that the user feature may be treated as currently unoccupied for the purposes of usage sequence generation.

Continuing to refer to FIG. 5, all or virtual map and/or first data structure may be stored on portable computing device 160 alternatively one or both may be downloaded from a remote device, such as a server on demand. For instance, when wireless receiver 104 arrives at a location corresponding to one or more navigable spaces 200, such as the entrance to a particular building, wireless receiver 104 may send a query to the remote device requesting first data structure portions and/or virtual map data corresponding to that location. Wireless receiver 104 may detect location using navigation services such as GPS. Wireless receiver 104 may detect location by receiving a signal from at least one first transmitter 128. The user may enter location information into the receiver using any input means described below in reference to FIG. 8. In some embodiments, wireless receiver 104 downloads the information for a set of navigable spaces 200 where there is a strong network connection; the connection may be over a cellular data network, a wireless connection to a network, or other means. In some embodiments, a user enters an instruction on wireless receiver 104 describing a location that the user plans to visit at a future point, and wireless receiver 104 downloads first data structure and/or virtual map information corresponding to that location.

At step 525, with continued reference to FIG. 5, portable computing device 160 determines a location of the user as a function of the first location. Portable computing device 160 may determine location of at least one first transmitter 128 relative to portable computing device 160. Portable computing device 160 may determine that at least one first transmitter 128 is closer than a certain distance from portable computing device 160 based on the signal range of at least one first transmitter 128; for instance, where at least one first transmitter 128 includes a passive transmitter, the range at which magnetic coupling is capable of powering at least one first transmitter 128 may be only a few inches at most. In other embodiments, portable computing device 160 may determine distance from the at least one at least a transmitter 128 using signal strength, with a stronger signal indicating closer proximity to at least one first transmitter 128.

Still viewing FIG. 5, portable computing device 160 may also determine the user's orientation relative to at least one first transmitter 128. For instance, determining the location of the user may involve determining that the user is located at the first location, because of the small effective distance of a passive transmitter and receiver pair. In an embodiment, orientation may be determined by determining that a user holding a receiver reading a passive transmitter is facing a vertical surface where the passive transmitter is located. Alternatively or additionally, user motion prior to or after receipt of first signal may be used to determine user orientation; an IMU or element thereof may be used to detect user motion. For instance, where device 100, using IMU, for example, determines that user has followed a path approaching at least a first transmitter 128 from a particular direction, device 100 may determine that user is facing in that direction; where IMU detects that user has turned, for instance, by turning toward at least a first transmitter 128, device 100 may update user's probable position. Detecting user's direction of motion may enable device 100 to determine user orientation with respect to a transmitter that is on a horizontal surface, such as on or under a counter, or otherwise mounted to an object that is not a vertical object such as a wall or sign; likewise, orientation relative to a non-fixed object such as a trashcan that has transmitter on it may be determined by detection of user motion through devices including but not limited to components of IMU 180.

Continuing to view FIG. 5, in some embodiments, instructions regarding orientation are given using the UCS of at least a transmitter 128 at which the user is currently located, as a sequence of turns and paces. As a non-limiting example, instructions to follow a given path may start with the assumption that the user is currently facing at least a transmitter 128, and instruct the user to (a) turn around, (b) proceed 5 feet (along the Y axis), (c) go to the right (along the X axis) for 8 feet, then (d) proceed for 3 feet at a 45-degree angle from the Y axis, as measured from the positive X axis (to the right of the Y axis in this example). In some embodiments, this sequence is provided to the user by way of user output component 164. Portable computing device 160 may produce or receive further instructions to provide to the user upon arriving at a subsequent at least a transmitter 128; the additional instructions may us orientation relative to the new at least a transmitter 128.

Still referring to FIG. 5, where there is a surface feature 216 located at the first location 204*a*, portable computing device 160 may use the surface feature 216 as a reference point to navigate the navigable space 200. In other words, portable computing device 160 may give directions to the user using the surface feature 216 as a starting point. In some embodiments, this gives the user a straightforward approach to use in entering any navigable space 200 in which the system 100 is deployed, where the user seeks out the surface feature 216, placing wireless receiver 104 in contact with at least one first transmitter 128, and portable computing device 160 uses path or wayfinding data to give the user navigation instructions 200 from the surface feature 216; the surface feature 216 may be in a predictable location within the navigable space 200. Alternatively, portable computing device 160 may maintain instructions for finding the surface feature 216 in memory accessible to portable computing device 160. Portable computing device 160 may determine the position of portable computing device 160 within the navigable space using the determined position of portable computing device 160 relative to at least one first transmitter 128. Portable computing device 160 may determine the position of portable computing device 160 within the navigable space using the determined position of portable computing device 160 relative to the second at least a transmitter 128. Portable computing device 160 may determine the position of portable computing device 160 within the navigable space 200 using IMU 180; for instance, portable computing device 160 may use IMU 180 to determine the direction and speed of motion of portable computing device 160 from an initial position; portable computing device 160 may use this to determine where the user is within the navigable space 200 and to determine whether the user is following a path within the navigable space 200 corresponding to a usage sequence as described above.

At step 530, with continued reference to FIG. 5, the portable computing device 160 provides the location of the user via a user output component 164 coupled to the portable computing device 160. Portable computing device may present the location of the user using the display 168. For instance, portable computing device may cause the display 168 to display information in large type. Portable computing device may cause the display 168 to display one or more shapes, such as directional arrows; for instance, a direction arrow may indicate the user location as in "you are here" note on a map. The direction indicated by the directional arrow may adjust its orientation relative to the user using data from an IMU 180. Other shapes, including stars, asterisks, and the like may alternatively or additionally be used. Portable computing device may present the location of the user using audio output device 172; for instance, portable computing device may cause a speaker, headphones, or a headset to output a verbal description of the location. The verbal description may be generated using text-to-speech software. The verbal description may be pre-recorded.

Portable computing device may present location of user using a tactile output device 176. Portable computing device may cause tactile output device 176 to output description of location of user in braille or in other texture-readable forms; tactile output may include, without limitation, a tactile map of the immediate area and/or tactile representations of features or operation thereof. Portable computing device may cause tactile output device 176 to output shapes, such as directional arrows, as described above.

At optional step 535, and still referring to FIG. 5, portable computing device 160 retrieves usage data from a second data structure linking the feature to usage data for using the feature. In an embodiment, portable computing device 160 may retrieve the usage data using identification of the user feature as described above from the data structure described in reference to FIGS. 1-4C.

At optional step 540, and continuing to refer to FIG. 5, portable computing device 160 may generate a usage sequence for using a user feature, such as user feature at second location, as a function of the location of the user, the second location, and the usage data. Portable computing device 160 may determine usage sequence by receiving a user instruction indicating a desired course of action. User instruction may be entered using any data entry device as described below in reference to FIG. 8. For instance, user instruction may be entered verbally, using speech recognition software. User instruction may be entered manually using a touchscreen, a keyboard, buttons, or other controls. In some embodiments, portable computing device 160 presents the user with a set of options, and receives a user instruction selecting an option from the set; this may be accomplished using the display 168 or a tactile output device 176 to list the options, or using an audio output device 172 to present the options similarly to an automated phone service. The options may correspond to a set of default usage sequences likely to be useful for the use of the navigable space 200. For example, likely usage sequences to be performed in a bathroom may involve using a toilet stall, using a urinal, washing at a sink, locating paper towels, or locating a trash can.

Still viewing FIG. 5, in some embodiments, portable computing device uses the instruction entered by the user to retrieve a usage sequence. A usage sequence may be a series of steps the user may take to accomplish a given task in the navigable space 200. As a non-limiting example, where the task is to use a bathroom stall, the sequence may involve (A) instructing the user to move in a direction toward a particular stall, (B) instructing the user how to enter the stall, (C) informing the user how to locate a toilet within stall, (D) informing the user how to locate toilet paper within stall, (E) and instructing the user how to flush using retrieved usage info. Further continuing the example, some portions of the usage sequence may be instructions to be performed by portable computing device or a computing device 218 coupled to the receiver, and not directly presented to the user; such steps may include (a) finding location of at least one bathroom stall, (b) determining which of the at least one stall is unoccupied, (c) determining which of the at least one stall is functioning, and (d) determining a path to the at least one stall from (1) location of the transmitter or (2) location of the receiver. Each of these steps may be determined using wayfinding data obtained from at least one first transmitter 128, a second transmitter 156, or from memory as described above. Where the user location differs from the second location, generating the usage sequence may involve generating at least an instruction for navigating from the user location to the second location; alternatively, portable computing device 160 may determine that first location and second location are substantially the same, indicating user is already at user feature, and may not generate navigation instructions. Where user is at user feature, portable computing device 160 may generate orientation instructions, for instance informing user by reference to a tactile indicator near or on user feature, or a transmitter near or at user feature, how to orient him or herself relative to user feature.

As a further example, and continuing to view FIG. 5, portable computing device may perform a sequence of steps to use a toilet in a restaurant or similar venue, including: a) storing the current table and seat location where the user is located; (b) retrieving information regarding a path to a restroom foyer or lobby; (c) once in the foyer or lobby, retrieving the path to the men's restroom; (d) once in the men's restroom, retrieving the path to the handicap toilet stall that contains a shelf and a paper toilet seat cover dispenser; (e) once at the toilet, retrieving the path to a handicap accessible sink and the relative locations of a nearby soap dispenser and a paper towel dispenser; (f) once at the sink, retrieving the path to the trash receptacle and restroom exit; and (g) once at the exit, retrieving the path back to the stored initial table and seat in the dining area. The arrival at each location may be detected by receiving, from at least a transmitter 128 at that location, the transmitter's wayfinding data. The retrieval of the path information in each step may be performed by receiving the path information from at least a transmitter 128 located at that step, by receiving the path information over the network using the identity of at least a transmitter 128 located at that step, or a combination of the two methods.

Continuing to view FIG. 5, an additional example illustrates the ability of portable computing device to use features within the navigable space to aid in navigation. In one embodiment, portable computing device performs a usage sequence that aids a user in finding and utilizing a urinal. Portable computing device may (a) find the closest men's restroom; (b) upon entry to the restroom, signal an automatically flushing urinal to flush when nobody is there. The signal may be performed using a wireless transceiver link as described above. The user may then walk toward the sound of the flushing urinal, with no need for further information indicating the urinal's location. The user may select a sequence using one or more spaces as described above prior to engaging in the sequence. The sequence may use path information from virtual map to guide the user through the navigational steps in the sequence. In an embodiment, a plurality of usage sequences may be configured; a user may configure usage sequences by requesting a list of desired usage sequences. Alternatively, list of usage sequences may be created by tracking past user interaction with device 100 or system; list may be ranked in order of probability that user will utilize a give usage sequence, where probability may be based on past usage by user. Device 100 may generate each usage sequence from the list that is possible in navigable space upon reception of the signal; alternatively device 100 may proffer a list of possible sequences from user list to user and generate a selected sequence upon receiving a user selection. As a non-limiting example, the user may create or request generation of a sequence to wash hands, instructing to user to proceed to the nearest restroom where the user is permitted, find the closest sink (or closest unoccupied sink), describe how to operate the sink and/or soap dispenser, indicate hand-drier location and operation if available and/or paper towel location and operation, indicate the location of a trash receptacle, and direct the user to the restroom exit; directions back to user's previous location may also be included. Persons skilled in the art, upon reading the entirety of this disclosure, will be aware of many other possible usage sequences, including without limitation sequences for using toilets, including particular categories of toilets, sequences for changing babies' diapers, sequences for locating and using ATMs, and the like.

Still viewing FIG. 5, in an embodiment, user feature has at least a user control. At least a user control may be a button, lever, sensor, switch, doorknob, door latch, keyboard, keypad, or other item that allows a user to switch on or off, open, move, or otherwise manipulate part or all of user feature. Retrieving usage data may involve retrieving data describing the at least a user control. Portable computing device may generate usage sequence in part by generating at least a user instruction for use of the user control; this may be accomplished, for instance, by adding a step in the sequence outputting the data describing the at least a user control. Data describing at least a user control may include, for instance data indicating a category of user control, such as motion sensor, door knob, door handle, lever, push-button, switch, and the like. Data describing at least a user control may include, as another example, data indicating a location on user feature of the user control, such as whether the user control is on the right or left side of the user feature when the user is facing it, whether the user control is on top of or under a counter, a height at which user control may be found, any object user may have to reach around to access the user control, and the like.

With continued reference to FIG. 5, portable computing device 160 may provide the usage sequence via a user output component 164 coupled to the portable computing device 160. Portable computing device may present the usage sequence using the display 168. For instance, portable computing device may cause the display 168 to display information in large type. Portable computing device may cause the display 168 to display one or more shapes, such as directional arrows; for instance, where the user has requested to proceed to a particular feature, as described in further detail below, portable computing device may cause the display 168 to display a directional arrow indicating the direction in which to proceed to arrive at the feature. The direction indicated by the directional arrow may adjust its orientation relative to the user using data from an IMU 180. Portable computing device may present the data using audio output device 172; for instance, portable computing device may cause a speaker, headphones, or a headset to output verbal instructions. The verbal instructions may be generated using text-to-speech software. The verbal instructions may be pre-recorded.

Portable computing device may present the usage sequence using a tactile output device 176; for instance, portable computing device may produce vibration to signal when the user is near to or facing a feature to which the user intends to proceed, as set forth in further detail below. Portable computing device may cause tactile output device 176 to output instructions in braille or in other texture-readable forms; tactile output may include, without limitation, a tactile map of the immediate area and/or tactile representations of features or operation thereof. Portable computing device may cause tactile output device 176 to output shapes, such as directional arrows; for instance, where the user has requested to proceed to a particular feature, as described in further detail below, portable computing device may cause tactile output device 220 to output a directional arrow indicating the direction in which to proceed to arrive at the feature. The direction indicated by the directional arrow may adjust its orientation relative to the user using data from an IMU 180.

In some embodiments, presenting the usage sequence to the user also involves looking up additional data, such as wayfinding data, using signal received from at least one first transmitter 128. Portable computing device may use one or more items of data from the signal as a key to retrieve additional data from memory. For instance, portable computing device may use an identifier that identifies at least one first transmitter 128 to retrieve data associated with that transmitter from memory; multiple data items may be used to form narrower selections of data. The data in memory may be stored on portable computing device or in a remote device (not shown) such as a server as described below in reference to FIG. 8, or other computing device. The data may be stored in a database as described below in reference to FIG. 8. The data may be stored in a data structure such as a tree, linked list, hash table, array, or any other suitable data structure.

In some embodiments, portable computing device causes user output component 164 to provide a single item of information to the user. The single item of information may be the current location of portable computing device, and hence the user. For instance, where at least one first transmitter 128 has a small range of communication, portable computing device may determine from the fact of communication with at least one first transmitter 128 that portable computing device is immediately adjacent to at least one first transmitter 128. Location information of at least one first transmitter 128 may therefore enable portable computing device to determine where in the navigable space 200 portable computing device is located. Likewise, portable computing device may cause user output component 164 to inform the user of data about an immediately user feature 212, such as a sink or stall; user output component 164 may identify the feature. User output component 164 may provide use information about the feature. User output component 164 may provide state information about the feature. Thus, as a non-limiting example, the user may place portable computing device close to at least one first transmitter 128; using data from at least one first transmitter 128 (either directly or as a key for data retrieval), portable computing device may determine that a toilet stall is immediately next to the user, that the toilet stall contains a toilet that automatically flushes, and that the toilet stall is not currently occupied. Further continuing the example, the user may know as a result how to proceed with using the toilet stall with relatively little trial and error; portable computing device may use orientation information concerning portable computing device or a coupled device to determine in which direction the user must likely turn to access the stall, and provide that information to the user as well.

Still referring to FIG. 5, one or more usage sequences may be presented to the user in response to scans of additional transmitters. For instance, where second transmitter 156 is located at the second location, providing the usage sequence to the user may include providing at least an instruction for navigating to the second location to the user, receiving a second signal from the second transmitter, and providing at least one additional instruction of the usage sequence to the user. Thus, for instance, portable computing device 160 may provide only navigation data for getting to the user feature until the user arrives at the user feature; portable computing device 160 may provide an instruction to the user instructing the user to place wireless receiver 104 near second transmitter 156 to obtain a signal from second transmitter 156. The at least one additional instruction produced after reception of second signal may include an instruction for using the user feature. The at least one additional instruction may include at least an instruction for navigating to a second user feature; for instance, usage sequence may involve navigating to a first feature, such as a toilet or urinal, using the first feature, navigating to a second feature, and using the second feature. This set of steps may be repeated one or more times: for instance, arriving at the sink, user may scan a third transmitter, obtaining instructions for using the sink and/or instructions to get to a third user feature, such as a hand drier or paper towel rack; another scan of a fourth transmitter at the third user feature may indicate how to find an exit from the bathroom. In an embodiment, portable computing device 160 receives an indication that user has completed the usage sequence; user may enter the indication through an input device, or wireless receiver 104 may receive a signal from a transmitter indicating that user has completed sequence. Portable computing device 160 may then use user output component 164 to ask user whether user wishes to perform another action, look for another feature, or receive further navigation instructions; one or more steps of method 500 may then be repeated.

Alternatively or additionally, and still referring to FIG. 5, usage sequence may be generated and/or output upon user navigating to a specific location. For instance, user may receive a first usage sequence directing user to navigate to a center of navigable space, a particular architectural feature or user feature, or a second transmitter; usage sequence may be provided to user upon arrival at specific location. User may enter an instruction indicating arrival at specific location, or device 100 may detect user arrival; detection may include receiving a signal from a second transmitter, which may be a return signal where second transmitter is a transponder. Detection may include detection of user motion, position, and/or orientation using an IMU to determine direction and/or distance of user travel. Detection may include detection of user motion, position, and/or orientation using one or more navigational facilities. Detection may include detection of user motion, position, and/or orientation using signals received at receiver 104 from one or more active transmitters including without limitation beacons. Usage sequence may be generated automatedly upon detection; for instance, user may have entered data used to identify second location, according to any means or method described above, prior to arrival at specific location. User may enter data used to identify second location, according to any means or method described above, upon arrival at specific location. Usage sequence may be generated previously, but provided to user only upon arrival at specific location.

Continuing to refer to FIG. 5, device 100 may cause user feature to signal its location to user. For instance, where user feature has an electronically controlled component that produces noise, such as an automated flusher in a toilet, device 100 may transmit a signal, directly or indirectly, to user feature that causes user feature to activate the electronically controlled component; as a non-limiting example, device 100 may cause an electronically flushing toilet to flush itself, alerting user to the direction in which to travel to arrive at the electronically flushing toilet. User feature may have a speaker, claxon, or other audio output device that may similarly be activated to orient user. Device 100 may similarly activate or detect an active transmitter located at user feature, including without limitation a beacon, to indicate a distance user must travel to arrive at user feature, using relative strength of signal, for instance. Strength of signal may be coupled with IMU data or other data tracking position, direction of motion, and/or orientation of user to determine whether user is proceeding toward user feature; corrective notifications may be provided to user to indicate whether user is proceeding toward user feature or not. User may trigger any one of these actions by entry of an instruction, for instance by activation of a button; alternatively or additionally, any one of these actions may occur automatedly when device 100 determines second location and/or user feature user has indicated desire to use as described above. This process may be performed in addition to or instead of generation of usage sequence as described herein.

With continued reference to FIG. 5, device 100 may detect whether user is following steps of usage sequence. Detection may be performed using an IMU, navigational facility, reference to signals from one or more active transmitters, including without limitation beacons, and/or reception of a signal from a second transmitter. In an embodiment, device 100 detects that user has deviated from usage sequence, for instance by proceeding to a different location from second location; device 100 may output an alert to user indicating that user has deviated. Device 100 may generate an updated usage sequence as a function of user's new current location; generation may be performed as described above. Where user is at or near a different user feature than that originally used for usage sequence, device 100 may generate a new usage sequence using the different user feature in place of the original user feature; this may be implemented as described above.

In some of the embodiments of method 500, and continuing to refer to FIG. 5, device 100 may receive information from the user. The information may include feedback about the functioning of device 100 in the navigable space 200 in question; for example, the user may find that a set of instructions failed to account for an obstacle, led the user to the wrong user feature 212, were out of date, or were difficult to follow, or that one or more user features did not function according to the use data provided. The information may include feedback about the navigable space 200, such as the discovery that a particular toilet did not function properly, or was closed for repair, or that the user has discovered a particularly helpful way to deal with a particular user feature. The information may be temporary in nature, as for a toilet that is out of order, or may indicate a more permanent situation, such as a particular location of a doorknob or particular way of using a given user feature when functioning correctly.

Continuing to refer to FIG. 5, in some embodiments, where at least a transmitter 128 includes writable memory 152b,c, the user may provide the information directly to the transmitter by writing to the transmitter memory. In some embodiments user-provided data in the writable memory is flagged as coming from a user, so that portable computing device 160 of a subsequent user is able to distinguish user-provided information from information provided by the administrator of device 100; in this way, a user may be able to assess the reliability of the data received from at least a transmitter 128. In some embodiments, the user instructs portable computing device 160 to write one or more items of data to a user-possessed transmitter, as described above; the data may indicate any information the user wishes to convey concerning an object attached to the user-possessed transmitter.

Still referring to FIG. 5, in other embodiments, the user enters the information on portable computing device 160, and the receiver provides the information to a computing device such as a remote server or data center. Portable computing device 160 may provide the information to the remote device when the network connection to the remote device is of sufficient quality to transmit information; if not, portable computing device 160 may store the information locally and upload the information to the remote device when the connection is sufficiently strong. In other embodiments, the user may enter the information on the system via a website or other application besides portable computing device 160. In some embodiments, the user enters the information on portable computing device 160 or website as text written or spoken by the user, as photographs, as videos, or in any other suitable form. In other embodiments, the user enters the information on portable computing device 160 or website in a pre-selected form; for instance, portable computing device 160 or website may present the user with one or more statements to which the user can indicate agreement. The one or more statements may be presented in the form of a checkbox, drop-down menu, the option to select one or more buttons, or the like. As a non-limiting example the statements to which the user may assent or not include the statement that a at least a transmitter 128 is not working, that at least a transmitter 128 or system 100 provided incorrect information, that more information is needed, or similar statements. Those comments along with the unique identification of the signs encountered or space encountered may be transmitted to an Internet connected storage location such as a remote device immediately or at a later time if Internet accessibility is not immediately available, as noted above.

With continued reference to FIG. 5, user-entered data may be stored by portable computing device 160 in a data structure a user identifier to transmitter 128 as described above in reference to FIGS. 1-4C; as a non-limiting example, linking to user identifier may indicate to other users or users of other devices similar to device 100 that data was entered by a particular user, or by the particular user of device 100. User-entered data may be provided to all users or only to the user that entered it; for instance, user may enter an instruction that an item of information concerning first transmitter 128 be shared with other users, or may enter an instruction that the item be available only to user. In the latter case, item may be provided to user along with usage sequence in a subsequent interaction with first transmitter 128. User-entered data may alternatively be linked to user feature, an architectural feature, or to another transmitter.

Still referring to FIG. 5, information entered by the user may be evaluated for its accuracy. Unevaluated information may be presented to users via portable computing device 160 or a website with an indication that it is user-entered data. In some embodiments, the evaluation is programmatic. In other embodiments, the evaluation is manual; for example, a person authorized to evaluation the information may check the accuracy of the submitted information and then enter an instruction indicating that the information is accurate. In some embodiments, wireless receiver 104 of a subsequent user encountering the same transmitter receives the information, and the user is asked to determine whether the user-entered information is correct; a plurality of subsequent users may be asked, with a threshold number or proportion of affirmative answers causing the information to be verified. In some embodiments, once the information is verified, device 100 transmits the information to portable computing device of a user who is in contact with at least a transmitter 128, and wireless receiver 104 writes the information to the transmitter; this may be performed automatically, without the user necessarily being aware of it.

In some embodiments, updated or modified data is entered on the at least a first transmitter 128 by an authorized user. Where the data corresponds to a given at least a transmitter 128, the updated information may be conveyed to a receiver 104 being used by a user that is in contact with the transmitter, and written to at least a transmitter 128 by that receiver 104; in some embodiments, the updated data is transmitted to all receivers 104 that are within a certain range of at least a transmitter 128 according to virtual map, such as all receivers 104 in the building or on the floor of the building where at least a transmitter 128 is located. Alternatively, and as discussed elsewhere herein, user-entered information may be made available in one or more data structures, and may be accessible to user, a group of which user is a member, to all users, to users having certain authentication credentials, or any other suitable access protocol.

User-entered information may include group information. Group information may be information concerning a group of users related by a particular interest or other commonality. As a non-limiting example, where at least a first transmitter 128 is installed at a street sign on behalf of a municipal government, a user representing the municipal government may enter user-entered information containing the information displayed on the sign, such as a street name, intersection, or the like. Continuing the example, a user who works with a public transportation system within the municipality may add user-entered information indicating one or more locations of bus stops, train stations, or similar items, relative to the sign. Further continuing the example, one or more owners or employees of local retail or service establishments may enter user-entered information directing users to their establishment. Each of these forms of information may be accessible to a user; in some embodiments, user instructions indicating a desired activity or sequence may cause the information to be filtered, for instance by providing, for a user interested in dining out, only information concerning nearby restaurants.

In some embodiments, wireless receiver 104 receives data from a third-party transmitter, such as a transmitter associated with a product or service in the navigable space 200. For instance, the third-party transmitter may be an RFID tag that contains product information. As a non-limiting example, the product information may include locations, ingredients, allergen, or nutritional data of food products on a menu or on a shelf in a grocery store. The product information may include menu item descriptions and prices at a restaurant. In other embodiments, the data from the third-party transmitter is content data; for instance, a restaurant may provide near-field communication tags on its salt and pepper shakers or condiment dispensers indicating the contents thereof. In other embodiments, wireless receiver 104 receives identifying information from the third-party transmitter, and uses the identifying information to retrieve product data or content data; the identifying information may identify the transmitter, a product, a container, or another item such as a sign, menu, or the like. Wireless receiver 104 may present this information to the user by way of user output component 164.

In an alternative or additional embodiment, wireless receiver 104 reads, using a code reader, a code. The code may be a UPC code or QR code attached to a product or feature. The code may be a third-party code. The code may contain product data. The code may contain content data. The code may include an identifier that wireless receiver 104 uses to retrieve product data or content data.

Figure 6:
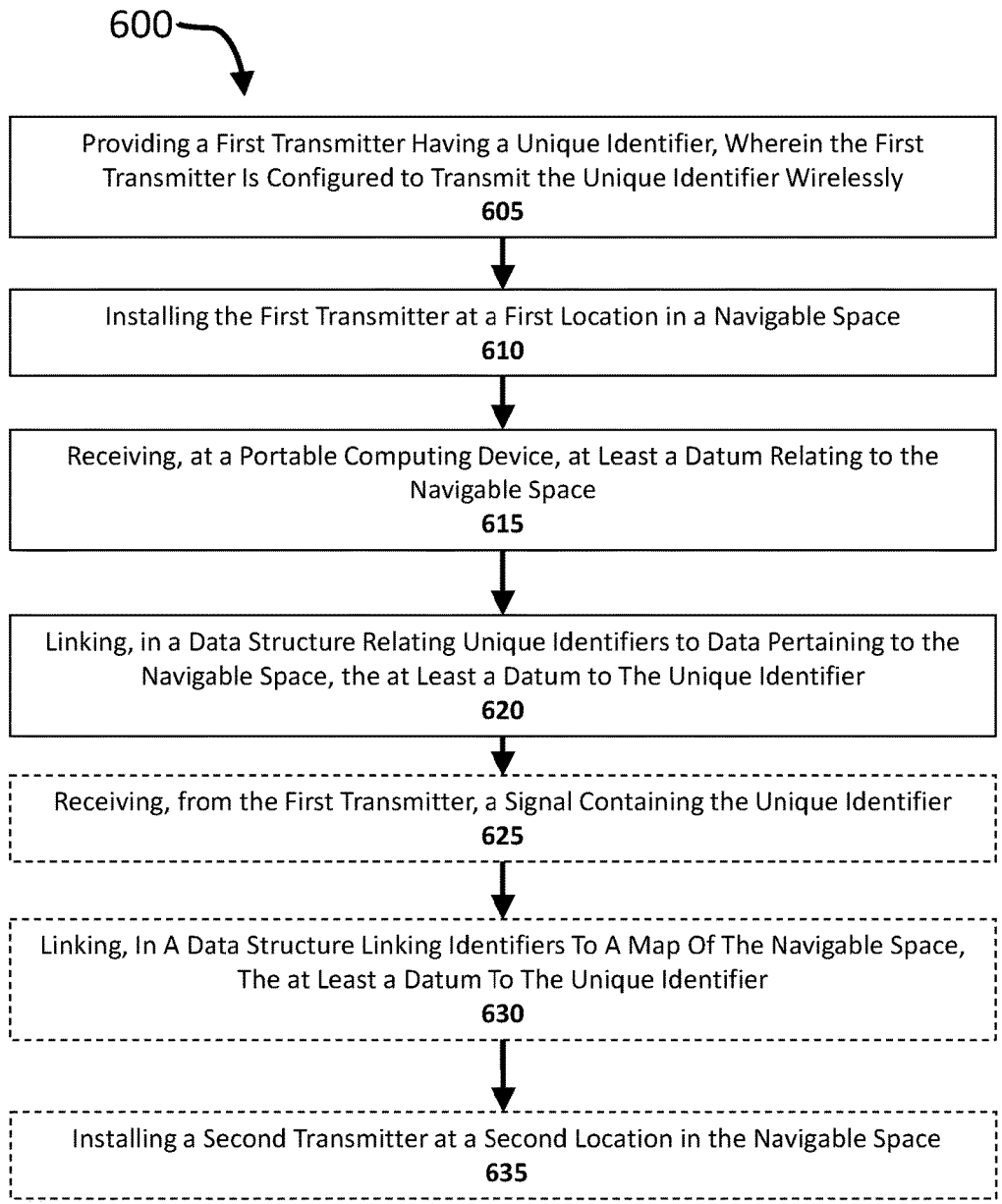
FIG. 6 is a flow diagram illustrated an exemplary method of installing a system for navigation and usage guidance in a navigable space.

Referring now to FIG. 6, an exemplary embodiment of a method 600 of installing a system for navigation and usage guidance in a navigable space is illustrated. At step 605, a first transmitter having a unique identifier is provided. First transmitter may be any transmitter suitable for use as at least a first transmitter 128 as described above. Unique identifier may be any unique identifier as described above. First transmitter may be configured to transmit the unique identifier; this may be implemented according to any means or methods described above in reference to FIG. 5.

At step 610, and still referring to FIG. 6, first transmitter is installed at a first location in a navigable space. Navigable space may be any navigable space 200 as described above. Installation may be performed by any means for installation consistent with FIGS. 1-5, including adhesion or other attachment to a sign such as an ADA sign, informational object, an architectural feature or user feature, incorporation in a sign, informational object, an architectural feature or user feature, or the like. First and/or second touch-discernable features may be installed in relation to first transmitter.

Continuing to view FIG. 6, at step 615, at least a datum relating to navigable space is received at a portable computing device. At least a datum may include any information in any form described above as pertaining to navigable spaces, user features, architectural features, transmitters, beacons, or any other items. At least a datum may include an indication of the first location is received at a portable computing device. Indication of first location may be received via user input; for instance, a user may identify the first location on a map such as described above, and enter an instruction identifying the first location, for instance by selecting the first location on a display indicating the first location within the map. User may enter an instruction indicating an architectural feature or user feature at which the first location is located; for instance, user may enter an instruction indicating that the first transmitter is located on a door frame of an exit from the navigable space 200, which can be identified on the map by computing device. User may alternatively or additionally be following instructions; for instance, computing device 100 may prompt user to install at a particular first location as part of an overall installation process. Received indication may include information usable to map first location to coordinates in a coordinate system as described above; for instance, coordinates may be entered directly, or inferred from a location of a locator, such as a mouse cursor or the like, that the user utilizes to indicate a displayed location.

Still viewing FIG. 6, received indication may include information identifying first location relative to a second location in navigable space. Second location may include a location of a second transmitter. Second location may include a location of a feature that a user may readily identify, with or without a transmitter. For instance, second location may include a location of an architectural feature, including without limitation a column, door, wall, change of flooring (e.g., change from one tile size to another, from carpet to tile, and the like), counter, corner, shelving, or any other architectural feature described above. Second location may include a user feature, including without limitation fixed features, such as sinks, stalls, ATMs, condiment stations, paper towel dispensers, coat hooks, toilet seat covers, and the like, and non-fixed features such as trash cans and the like. Second location may include a location of any element of an assembly 300 as described above, including first and/or second touch-discernable features, informational objects, and the like.

With continued reference to FIG. 6, information identifying first location relative to second location may include numerical instructions, such as distance and direction of travel from second location to first location. Information identifying first location relative to second location may include one or more instructions, such as instructions to turn toward second location and proceed a certain number of steps in that direction. Information identifying first location relative to second location may include information usable to identify second location, such as information describing an architectural feature, user feature, and/or element of an assembly 300 at second location. Received information may, as a non-limiting example, instruct a user to proceed to second location and then continue from second location to one or more additional locations within navigable space; the second location may be a central location within navigable space, from which travel to other locations is relatively straightforward, such as a door to a restroom, or just inside a door to a restroom.

Continuing to refer to FIG. 6, receiving indication of first location may include receiving information entered by a user. For instance, a user that is installing first transmitter may physically measure distances between first location and second location, and enter the physically measured distances using any input devices described herein. User may enter additional instructions for navigation to or use of second location; additional instructions may include any feature data as described above, relating to any feature at second location or at additional locations. Additional instructions may include usage sequences or portions thereof as described above. Additional instructions may include an identity of a venue at which navigable space is located; venue may be, for instance, a restaurant, hotel, or other building. Additional instructions may include a name of navigable space or some portion thereof; as a non-limiting example, name may identify navigable space as a Men's restroom, a food court, or the like. Instructions may be entered during the process in which first transmitter is installed, or at an earlier or later time; for instance, a user may enter any indication of first location and/or additional instructions prior to installation of first transmitter, immediately after installation, or at any point subsequent to installation.

In an embodiment, and still referring to FIG. 6, a user entering information including any indication of first location and/or additional instructions by following one or more prompts provided to user via user output component 164. As a non-limiting example, device 100 may prompt user to install first transmitter at one or more pre-selected locations. For instance, device 100 may previously receive an instruction or otherwise be configured to identify a first location where first transmitter is to be installed, such as an entryway, ADA-compliant sign, or the like; user may be provided an instruction to install first transmitter one of the one or more pre-selected locations, and then prompted to select the location at which installation occurred, or where there is only a single pre-selected location, to indicate that installation occurred at that location. A user may similarly be prompted to enter locations of additional transmitters as described below, measured distances between first location and second location and/or additional locations, and the like. A user may be prompted to enter a sequence of directions for navigation to and/or use of a user feature, exit door, or the like. As a non-limiting illustration, a user may be prompted to enter, and enter a first instruction indicating a direction in which to proceed from a known orientation, such as the orientation of a user currently located at first location; user may select from a set of prompts including "left," "right," "diagonally right," and so forth. User may be prompted to enter a distance in which to proceed in the chosen direction, and may be provided a field to enter a distance in some unit or units of measurement, or to select from a list of preset distances in a dropdown list. User may alternatively or additionally be prompted to enter a distance to travel in terms of an architectural feature, user feature, or other landmark, such as an instruction to proceed to the end of a wall, to a door frame, into a vestibule, or the like. These prompts may continue to request additional instructions until user has indicated that a person following the instructions would arrive at the feature in question; user may have a "sequence completed" button or the like to select to indicate that a navigation sequence, usage sequence, or both may have been completed. Sequences may be entered and/or stored relating two or more associated features, such as a sequence or instruction describing location of a soap dispenser relative to a sink, as well as usage instructions for the soap dispenser, a sequence or instruction describing a location of a coat hook within a stall, relative to a stall door, a sequence or instruction indicating how to locate a seat cover relative to a stall door, and the like.

Still viewing FIG. 6, receiving the indication of the first location may include receiving, from a second transmitter, a signal and identifying the first location as a function of the signal. Second transmitter may have a first location that has already been recorded by reference to map. In an embodiment, computing device may receive signal from second transmitter, determine first location of computing device as a result of the signal as described above, detect that it is being carried to first location, and identify first location as a function of the detection; detection may include, for instance, receiving unique identifier from first transmitter. Thus, for example, user may "tap" second transmitter at its known first location, walk to first transmitter, and then "tap" first transmitter; elements coupled to computing device, including without limitation an IMU or any element thereof, navigational facilities, and/or signals from one or more beacons, may be used to determine the path the user has taken while carrying computing device, so that upon reception of unique identifier from first transmitter, computing device is able to determine its current first location, and thus the first location of first transmitter. Alternatively or additionally, second transmitter may include one or more beacons, which computing device may use to determine its first location when contacting first transmitter. The above-described methods for receiving an indication of the first location may be combined; for instance where second transmitter is used to determine first location, determined first location may be presented to user for correction or approval, and user may enter an instruction verifying that the first location is correct or correcting the first location.

At step 620, and still referring to FIG. 6, the computing device links unique identifier to at least a datum in a data structure relating unique identifiers to data pertaining to navigable space. Data structure may be any data structure as described herein. Computing device may link first location to unique identifier in a data structure relating the first location to at least a second location in the navigable space. Data structure may include any data structure as described above, including without limitation data structure in list form, such as a vector, linked list, or array, a recursive structure such as a tree, or a database; data structure may or may not be related to a map as described above. Computing device may link unique identifier with one or more additional items of information in data structure or an additional data structure, including without limitation any additional instructions, navigation sequences, usage sequences, identification of venue, or name of navigable space and/or portion of navigable space. Information may be linked using any data structures described above, including without limitation data structures containing usage data and/or usage sequences or components thereof, as described above.

At optional step 625, and with continued reference to FIG. 6, computing device may receive, from first transmitter, a signal containing the unique identifier. Receiving may be implemented in any manner described above for reception of a signal from at least a transmitter. By way of illustration, and as a non-limiting example, user may install first transmitter, select from a set of prompts the name "Men's Restroom," and receive signal from the first transmitter; signal may be parsed as described above to obtain unique identifier, which then may be linked to the name "Men's Restroom" as well as a location received or detected as described above.

At optional step 630, and still referring to FIG. 6, the computing device links the first location to the unique identifier in a data structure linking identifiers to a map of the navigable space. Data structure and map may be implemented in any manner described above. User may enter any additional information concerning first location, including user information, group information, usage data, and the like. Each of steps 605-630 may be repeated for multiple transmitters, for instance to install transmitters throughout navigable space or a building or other area containing navigable spaces. A transmitter at an exterior to building or area may be established as a "root" of data structure; data structure may be incorporated or a part of a larger data structure, including without limitation maps used for navigation facilities, additional data structures of larger areas, or data structures of other navigable spaces, buildings, or areas that may be joined to data structure to link information together.

At optional step 635, and continuing to refer to FIG. 6, a second transmitter may be installed at a second location in navigable space. Second transmitter may be installed at any suitable location for installation of first transmitter, including without limitation at a user feature. In an embodiment, a user installing second transmitter, who may or may not be the user installing first transmitter, may enter an instruction specifying a user feature, such as an accessible toilet; user may then install second transmitter at user feature, such as without limitation on a back of a stall door to the accessible toilet. An indication of second location at which second transmitter has been or is going to be installed may also be received as described above, along with any additional instructions, usage sequences, navigation sequences, venue identifiers, or names as described above. Information may be linked to a second unique identifier stored on second transmitter; linking may be implemented as described above; linking may include receiving a signal from second transmitter and parsing the signal to obtain the second unique identifier as described above. Method 600 may include installation of additional transmitters as described herein; each transmitter may be related to other installed transmitters using any data structure and/or map as described above.

Still referring to FIG. 6, the following exemplary embodiment is presented to illustrate a possible implementation of method 600; the presentation of this example is for the purposes of illustration only, and should not be construed as limiting in any way the scope of method 600 or of any other method or system disclosed herein. In an exemplary embodiment, a user may identify or name in a data structure, which may include a database, first location; user may enter this information via a mobile computing device such as a smartphone by way of a mobile application and/or web application. Data structure may be located on a cloud service or other remote data service. First location may, in this example, be placed on a map as described above; alternatively or initially, no map may be used. User may enter one or more further instructions describing or referring to a venue (e.g., a particular restaurant brand at a particular address) via the computing device. User may enter one or more instructions describing or referring to a name for navigable space, such as "Men's Restroom"; name may be selected from a list of names for specific locations at the venue. Further continuing the example, user may install first transmitter at a particular location, such as an ADA sign next to the Men's restroom. User may enter information linking name to unique identifier of first transmitter; this may be performed, for example, by scanning or otherwise receiving a signal from first transmitter after selection of name as described above. Computing device may obtain the unique identifier according to any process described above; as a non-limiting example, computing device may receive a signal from first transmitter, parse the signal, extract the unique identifier from the signal, and link the name to the unique identifier.

Continuing to refer to FIG. 6, and further continuing the example, user may create or select a description of a feature via computing device, for instance by creating or selecting the description of the feature using a mobile or web application; as an illustrative example, user may select a feature description corresponding to an accessible toilet. User may install a second transmitter at a location corresponding to the feature description; as an illustrative example, where the feature description corresponds to an accessible toilet, user may install the second transmitter on the back of a stall door to the accessible toilet. Still continuing the example, computing device may link the feature name with a unique identifier of the second transmitter; this may be implemented using any procedure for linking as described above.

Alternatively or additionally, and still referring to FIG. 6, user may create or select a description of a particular location within navigable space, where the particular location may or may not be a location of a feature. Particular location may, for instance, be an easily identifiable location within navigable space; particular location may be a location adjacent to an architectural feature, such as a location just inside a door to a restroom. Particular location may be a location adjacent to a user feature, such as adjacent to a stall or bank of stalls. Particular location may be a location of a tactile sign, baseboard guide, or other informational object as described above. Particular location may be a central location within navigable space, such as a central location within a room. Second transmitter may be located at particular location; alternatively or additionally, mobile computing device may track user's progress toward particular location using navigational means, beacons, IMU, or any combination thereof. In an embodiment, mobile computing device, as configured by a mobile application, web application, or the like, and/or as triggered or instructed by a signal from first transmitter, may instruct user to proceed to particular location. Alternatively or additionally, an informational object such as a tactile sign or the like may direct user to proceed to particular location.

With continued reference to FIG. 6, and further continuing the example, upon arrival at particular location, user may proceed to a feature, such as an architectural feature or a user feature; feature may have been entered, created, or selected by user via computing device. Feature may be selected or identified by user upon arrival at particular location; selection of feature may be performed according to any means or method as described herein for selection of a feature, such as without limitation any means or method for selection of a feature in any step of method 500 above. User receive instructions to proceed to feature; instructions may be presented to user by any user output component 164 as described above. Instructions may be generated according to any means or method described herein, including any means or method for producing navigational instructions in any step of method 500 as described above. Alternatively or additionally, user may manually enter directions from first transmitter and/or particular location to particular location and/or feature, or vice-versa. User may enter directions by typing, speaking, selection from pre-created options presented to user, or any other suitable means or method. Directions so entered may be inserted in a data structure such as second data structure described in reference to FIG. 5; directions may be linked to additional directions such as directions for navigating to first transmitter and/or particular location, directions for using feature, or any other usage, operational, or other data. As a non-limiting example, directions may instruct a later user to proceed in a particular direction, such as straight in front of the user, to the left, to the right, at a diagonal to the right, or the like, to travel a distance, such as 8 feet, in the given direction, and/or proceed to an intermediate destination such as the end of the wall or inside the door to a vestibule; similar steps may be repeated until the user arrives at particular location, user feature, or any other intended destination. Directions may include a first set of directions to a primary feature and a second set of directions to an associated feature; for instance, directions may first instruct a user to proceed to and/or use a sink, and subsequently to proceed to and/or use a soap dispenser. Directions may instruct a user to a stall door and subsequently to a coat hook within or at a corresponding stall. Directions may instruct a user to a stall door and subsequently to a seat cover within a corresponding stall. Feature usage data of each primary and/or secondary feature may be included and/or linked to directions, and may be added to one or more data structures such as without limitation second data structure as described above in reference to FIG. 5. In an embodiment, a subsequent user, who may or may not be the user that performed steps of method 600 as described above may modify or replace directions. Any step or steps of the above-described process or processes may be repeated for additional locations with or without additional transmitters, additional features, and the like.

Figure 7:
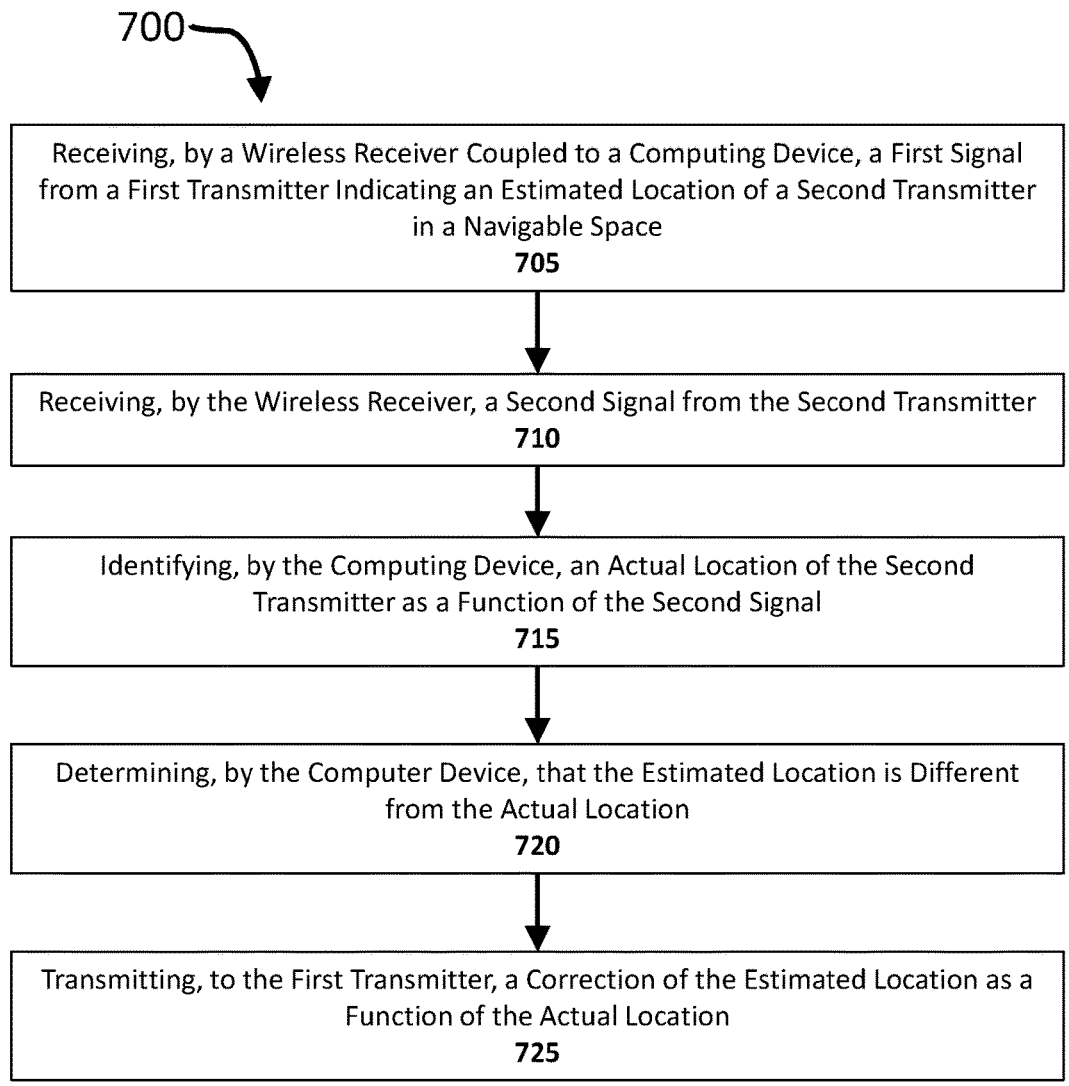
FIG. 7 is a flow diagram illustrated an exemplary method of calibration of transmitter-provided location.

Turning now to FIG. 7, an exemplary embodiment of a method 700 of calibration of transmitter-provided location data is illustrated. At step 705, a first signal from a first transmitter indicating an estimated location of a second transmitter in a navigable space is received by a wireless receiver coupled to a computing device. Wireless receiver may be any wireless receiver 104 as described above; computing device may be, without limitation, any portable computing device 160 as described above. First transmitter and/or may be any transmitter suitable for use as at least a first transmitter 128 or a second transmitter 156; for instance, first transmitter may include one or more beacons, and first transmitter may estimate and/or detect location of wireless receiver 104 according to any protocol for such detection by beacons.

At step 710, and still referring to FIG. 7, wireless receiver receives a second signal from second transmitter; where second transmitter is a passive transmitter, receiving may include interrogating second transmitter and receiving a return signal as above. At step 715, computing device identifies an actual location of the second transmitter as a function of the second signal. Determining actual location may be performed according to any means or method described above, including without limitation determination based on proximity to a passive second transmitter. Location may be determined by reference to a data structure and/or map as described above in reference to FIG. 5. At step 720, computing device determines that estimated location is different from actual location; for instance, estimated location and actual location may indicate different locations within a coordinate system as described above; determining that they are different may involve determining that the difference between their points in the coordinate system under a norm used to measure distance in the coordinate system, is greater than some threshold amount or tolerance. Threshold amount or tolerance may be any virtual, relative, or absolute distance. For instance, threshold amount may a half-meter in any horizontal direction, a meter in any direction, or any desired threshold set by a user. Threshold may correspond to a minimum resolution of accuracy for estimating locations according to methods used by first transmitter; for instance, if first transmitter is a beacon, and is unable typically to detect a user location more accurately than within a foot of the user location, threshold may be equal to or greater than one foot.

At step 720, with continued reference to FIG. 7, computing device may transmit, via the wireless receiver and to the first transmitter, a correction of the estimated location as a function of the actual location. Correction may include the actual location, for instance the coordinates thereof. Correction may include a degree and direction of inaccuracy. In some embodiments, this method enables beacons to correct for environmental distortion of location methods, such as distortion created by unexpectedly reflecting signals, noise, overcrowding, and the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
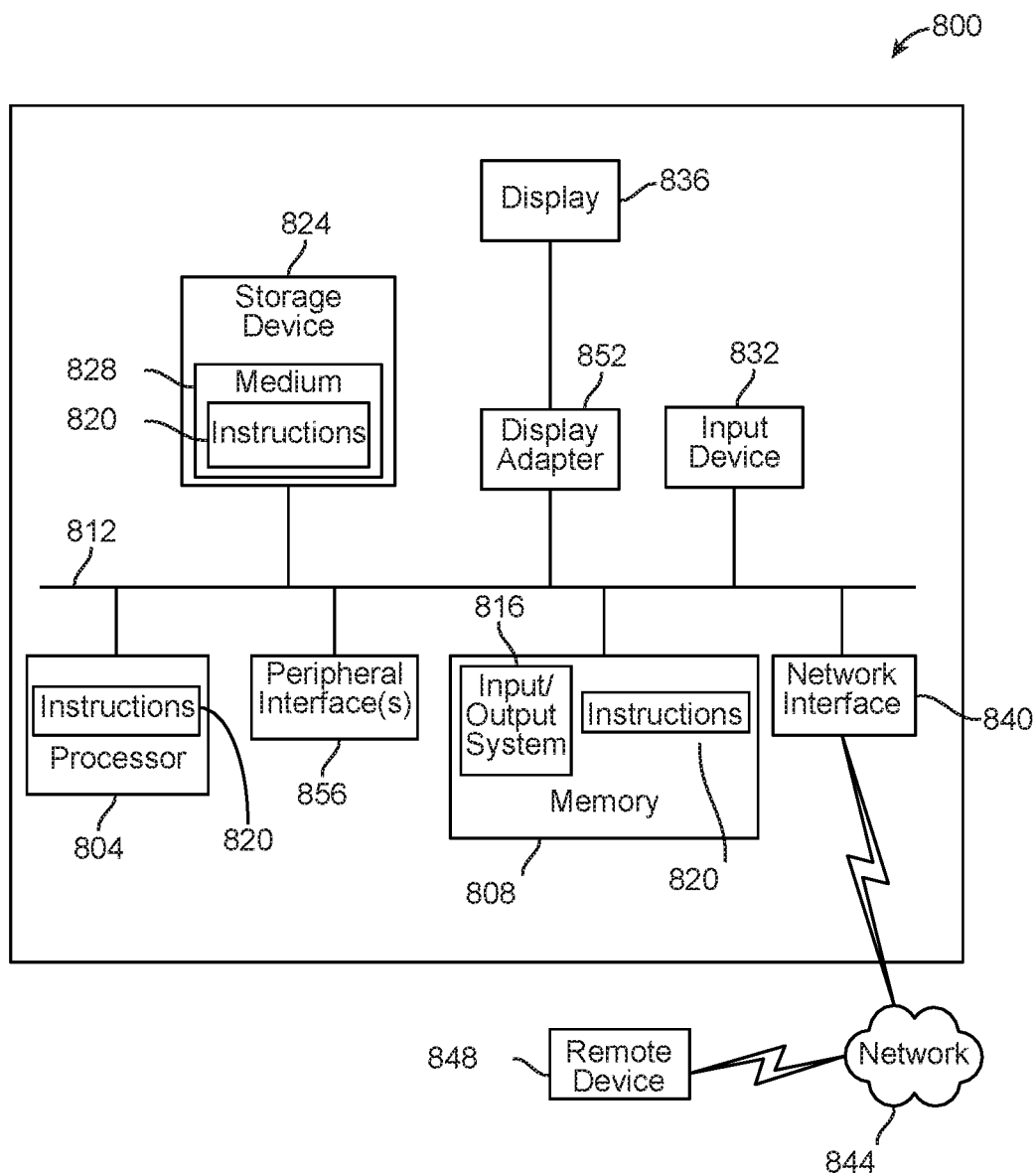
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system, such as the above-described systems and methods, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Memory 808 may include various components (e.g., machine-readable media) including, but not limited to, a random access memory component, a read only component, and any combinations thereof. In one example, a basic input/output system 818 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system 80, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system 80, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 838, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 838. Examples of a display device include, but are not limited to, a liquid crystal display (LCD), a cathode ray tube (CRT), a plasma display, a light emitting diode (LED) display, and any combinations thereof. Display adapter 852 and display device 838 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 858. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A device for using wireless communication for navigation and usage guidance in a navigable space, the device on the person of a user, the device comprising:
    a wireless interrogator, wherein the wireless interrogator comprises:
        an antenna; and
        a driver circuit configured to:
            wirelessly transmit, via the antenna, an interrogation signal providing electrical power to a passive transponder, wherein the passive transponder is located at a first location in a navigable space; and
            wirelessly receive from the transponder, and via the antenna, a return signal; and
    a portable computing device, the portable computing device coupled to the wireless interrogator, wherein the portable computing device is designed and configured to:
        parse the return signal for at least a textual element;
        extract from the at least a textual element, a unique identifier of the transmitter;
        identify, in a first data structure linking the unique identifier to a map of the navigable space, the first location and a second location of a user feature;
        determine, as a function of the first location, a location of the user;
        retrieve, from a second data structure linking the feature to usage data for using the feature, the usage data; and
        generate a usage sequence for using the user feature, as a function of the location of the user, the second location, and the usage data; and
    a user output component coupled to the portable computing device, wherein the user output component is configured to:
        receive, from the portable computing device, the usage sequence; and
        provide to the user the usage sequence.

2. A method of navigation and usage guidance in a navigable space, the method comprising:
    receiving, by a portable computing device coupled to a wireless receiver, a first signal from a first transmitter, wherein the first transmitter is located at a first location in a navigable space;
    parsing, by the portable computing device, the first signal for at least a textual element;
    extracting, by the portable computing device, from the at least a textual element, a unique identifier of the first transmitter;
    identifying, by the portable computing device, in a first data structure linking the unique identifier to the first location, the first location;
    determining, by the portable computing device, as a function of the first location, a location of the user;
    identifying, by the portable computing device, a second location of a user feature;
    retrieving, by the portable computing device, from a second data structure linking the feature to usage data for using the feature, the usage data;
    generating, by the portable computing device, a usage sequence for using the user feature, as a function of the location of the user, the second location, and the usage data; and
    providing, by the computing device, via a user output component, the user location and the usage sequence.

3. The method of claim 2, wherein the first transmitter is a passive transponder, and wherein receiving the first signal further comprises:
    wirelessly transmitting, via an antenna of the wireless receiver, an interrogation signal providing electrical power to the first transmitter; and
    wirelessly receiving from the first transmitter, and via the antenna, a return signal.

4. The method of claim 2, wherein determining the location of the user further comprises determining that the user is located at the first location.

5. The method of claim 1, wherein extracting further comprises extracting at least an additional datum, and further comprising providing the at least an additional datum to the user via the user output component.

6. The method of claim 1, wherein the first data structure further comprises a data structure linking the unique identifier to a map of the navigable space.

7. The method of claim 1, wherein identifying the first location in the first data structure further comprises identifying a second location of a user feature.

8. The method of claim 7, wherein identifying the second location further comprises:
    receiving a user instruction;
    selecting an identification of the user feature from a plurality of identifications of user features as a function of the user instruction; and
    identifying the second location in the first data structure using the identification of the user feature.

9. The method of claim 8, wherein the user instruction contains the identification of the user feature.

10. The method of claim 8, wherein selecting the identification of the user feature further comprises:
    determining an identification of a category of user feature as a function of the user instruction;
    identifying at least an identification of a user feature of the plurality of identifications of user features, the at least an identification matching the category; and
    selecting the identification of the user feature from the at least an identification of the user feature.

11. The method of claim 10, wherein the user instruction specifies the category.

12. The method of claim 10, wherein the user instruction indicates a desired action, and further comprising identifying the category using the desired action.

13. The method of claim 10, wherein selecting the identification of the user feature from the plurality of identifications of user features further comprises:
  computing a distance from the user location to each user feature identified by the plurality of identifications of user features; and
  determining that the distance to the user feature is a smallest distance of the distance from the user location to each user feature.

14. The method of claim 10, wherein selecting the identification of the user feature from the plurality of identifications of user features further comprises determining that the user feature is unoccupied.

15. The method of claim 1, wherein generating the usage sequence further comprises receiving a user instruction at the portable computing device indicating a desired action, and generating the usage sequence as a function of the desired action.

16. The method of claim 1, wherein:
  the user feature has at least a user control;
  retrieving usage data further comprises retrieving data describing the at least a user control; and
  generating the usage sequence further comprises generating at least a user instruction for use of the user control.

17. The method of claim 16, wherein generating the at least a user instruction for use of the user control further comprises generating a user instruction indicating a location of the user control at the user feature.

18. The method of claim 16, wherein generating the at least a user instruction for use of the user control further comprises generating a user instruction indicating a category of the user control.

19. The method of claim 1, wherein the user location differs from the second location, and generating the usage sequence further comprises generating at least an instruction for navigating from the user location to the second location.

20. The method of claim 19, wherein a second transmitter is located at the second location, and wherein providing the usage sequence to the user further comprises:
  providing the at least an instruction for navigating to the second location to the user;
  receiving a second signal from the second transmitter; and
  providing at least one additional instruction of the usage sequence to the user.

21. The method of claim 20, wherein the at least one additional instruction further comprises an instruction for using the user feature.

22. The method of claim 20, wherein the at least one additional instruction further comprises at least an instruction for navigating to a third location.

23. The method of claim 2 further comprising determining, by the portable computing device, as a function of the first location, a user orientation.

* * * * *

UNITED STATES PATENT AND TRADEMARK OFFICE
CERTIFICATE OF CORRECTION

PATENT NO. : 10,126,132 B2  
APPLICATION NO. : 15/871976  
DATED : November 13, 2018  
INVENTOR(S) : Darwin Wayne Belt et al.

It is certified that error appears in the above-identified patent and that said Letters Patent is hereby corrected as shown below:

In the Claims

Claims 5, 6, 7, 15, 16, and 19 state "The method of claim 1..." This should be changed in each of these claims to "The method of claim 2"

Signed and Sealed this  
Eighteenth Day of January, 2022

Drew Hirshfeld  
*Performing the Functions and Duties of the*  
*Under Secretary of Commerce for Intellectual Property and*  
*Director of the United States Patent and Trademark Office*